(12) United States Patent
Hagiwara et al.

(10) Patent No.: US 11,038,206 B2
(45) Date of Patent: Jun. 15, 2021

(54) NONAQUEOUS ELECTROLYTE BATTERY, AND BATTERY PACK

(71) Applicants: KABUSHIKI KAISHA TOSHIBA, Minato-ku (JP); Toshiba Infrastructure Systems & Solutions Corporation, Kawasaki (JP)

(72) Inventors: Asuna Hagiwara, Kashiwazaki (JP); Dai Yamamoto, Kashiwazaki (JP); Masanori Tanaka, Kashiwazaki (JP)

(73) Assignees: KABUSHIKI KAISHA TOSHIBA, Minato-ku (JP); Toshiba Infrastructure Systems & Solutions Corporatio, Kawasaki (JP)

( * ) Notice: Subject to any disclaimer, the term of this patent is extended or adjusted under 35 U.S.C. 154(b) by 114 days.

(21) Appl. No.: 16/398,383

(22) Filed: Apr. 30, 2019

(65) Prior Publication Data

US 2019/0260085 A1   Aug. 22, 2019

Related U.S. Application Data

(63) Continuation of application No. PCT/JP2017/040773, filed on Nov. 13, 2017.

(30) Foreign Application Priority Data

Nov. 14, 2016 (JP) .............................. JP2016-221136

(51) Int. Cl.
*H01M 10/0569* (2010.01)
*H01M 4/131* (2010.01)
(Continued)

(52) U.S. Cl.
CPC ....... *H01M 10/0569* (2013.01); *H01M 4/131* (2013.01); *H01M 4/1391* (2013.01);
(Continued)

(58) Field of Classification Search
CPC ...... H01M 4/131; H01M 4/505; H01M 4/525; H01M 10/0525; H01M 10/0569;
(Continued)

(56) References Cited

U.S. PATENT DOCUMENTS

2005/0178570 A1* 8/2005 King, Jr. ............... H02G 7/205
174/45 R
2005/0221188 A1  10/2005 Takami et al.
(Continued)

FOREIGN PATENT DOCUMENTS

JP     2005-317512    11/2005
JP     2008-91326     4/2008
(Continued)

OTHER PUBLICATIONS

International Search Report dated Feb. 13, 2018 in PCT/JP2017/040773, filed on Nov. 13, 2017 (with English Translation).
(Continued)

*Primary Examiner* — Alexander Usyatinsky
(74) *Attorney, Agent, or Firm* — Oblon, McClelland, Maier & Neustadt, L.L.P.

(57) ABSTRACT

A nonaqueous electrolyte battery includes a container member, a positive electrode stored in the container member, a negative electrode stored in the container member, and a nonaqueous electrolyte stored in the container member. A gas composition in the container member satisfies, when a charge ratio of the nonaqueous electrolyte battery is set to 30% and the nonaqueous electrolyte battery is left stand at 35° C. for 24 hrs, $$0.02 \text{ (cc/g)} \leq V_{H_2} \leq 0.1 \text{ (cc/g)} \tag{1}$$

$$0.05 \leq V_{C_3H_6}/V_{CO} \leq 0.1 \tag{2}$$

$$1 \leq V_{CO}/V_{H_2} \leq 9 \tag{3}$$

4 Claims, 6 Drawing Sheets

(51) Int. Cl.
*H01M 4/505* (2010.01)
*H01M 4/525* (2010.01)
*H01M 10/0525* (2010.01)
*H01M 4/1391* (2010.01)
*H01M 4/485* (2010.01)
*H01M 50/20* (2021.01)

(52) U.S. Cl.
CPC ........... *H01M 4/485* (2013.01); *H01M 4/505* (2013.01); *H01M 4/525* (2013.01); *H01M 10/0525* (2013.01); *H01M 50/20* (2021.01); *H01M 2300/0037* (2013.01); *Y02E 60/10* (2013.01)

(58) Field of Classification Search
CPC .. H01M 2/1016; H01M 10/049; H01M 4/485; H01M 4/1391; H01M 2/10; H01M 2300/0037; H01M 2/1229; Y02E 60/10
See application file for complete search history.

(56) References Cited

U.S. PATENT DOCUMENTS

| | | | | |
|---|---|---|---|---|
| 2010/0178570 | A1* | 7/2010 | Kozono | H01M 10/0525 429/338 |
| 2014/0162117 | A1* | 6/2014 | Matsuno | H01M 10/052 429/188 |
| 2015/0255795 | A1* | 9/2015 | Sano | H01M 10/0525 429/163 |

FOREIGN PATENT DOCUMENTS

| | | |
|---|---|---|
| JP | 2010-212092 | 9/2010 |
| JP | 2013-45759 A | 3/2013 |
| WO | WO 2013/031253 A1 | 3/2013 |
| WO | WO 2014/051020 A1 | 4/2014 |

OTHER PUBLICATIONS

Written Opinion dated Feb. 13, 2018 in PCT/JP2017/040773, filed on Nov. 13, 2017.

* cited by examiner

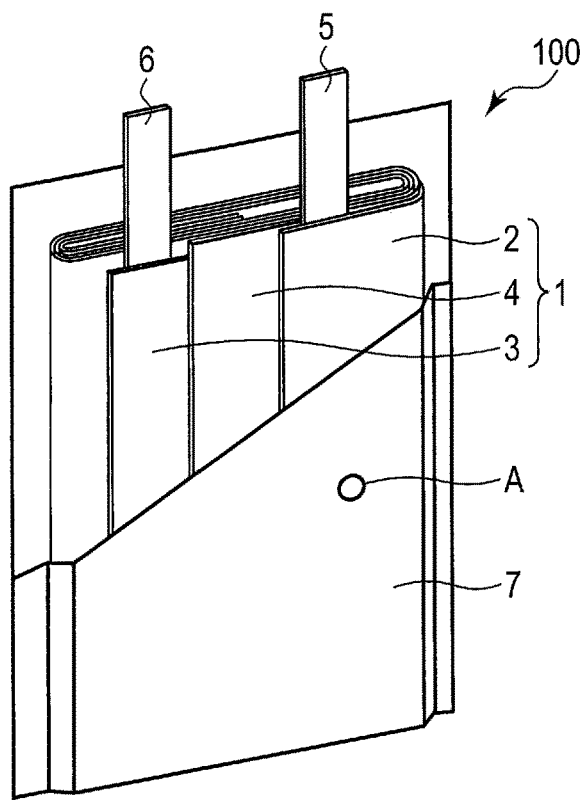
F I G. 1
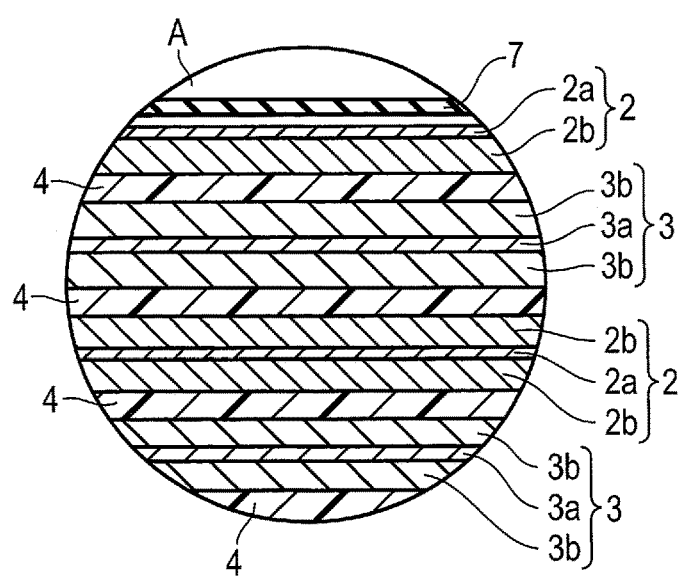
F I G. 2

NONAQUEOUS ELECTROLYTE BATTERY, AND BATTERY PACK

CROSS-REFERENCE TO RELATED APPLICATIONS

This application is a Continuation Application of PCT Application No. PCT/JP2017/040773, filed Nov. 13, 2017 and based upon and claiming the benefit of priority from Japanese Patent Application No. 2016-221136, filed Nov. 14, 2016, the entire contents of all of which are incorporated herein by reference.

FIELD

Embodiments described herein relate generally to a nonaqueous electrolyte battery, and a battery pack.

BACKGROUND

Lithium ion secondary batteries are widely used in portable devices, automobiles, storage batteries, and the like. In a lithium ion secondary battery containing carbon as a negative electrode active material, when the charge-and-discharge cycle is repeated, a lithium dendrite is formed on the negative electrode. For this reason, in a lithium ion secondary battery using a carbon-based negative electrode active material, it is concerned that a degradation in battery performance such as an increase in the resistance or lowering of cycle performance occurs. To cope with this, metal oxides that replace the above-described carbon-based negative electrode material have been examined.

When a spinel type lithium titanate ($Li_4Ti_5O_{12}$) is used for the negative electrode, deposition of a lithium dendrite can be suppressed. As a result, it is possible to avoid the risk of a short circuit, self-discharge, ignition, or the like and produce a battery with excellent life performance, as is known. It is also known that when the specific surface area is increased, a high power can be obtained.

BRIEF DESCRIPTION OF THE DRAWINGS

FIG. 1 is a partially cutaway perspective view of a nonaqueous electrolyte battery of the first example according to the first embodiment;

FIG. 2 is an enlarged sectional view of a portion A shown in FIG. 1;

DETAILED DESCRIPTION

Figure 3:
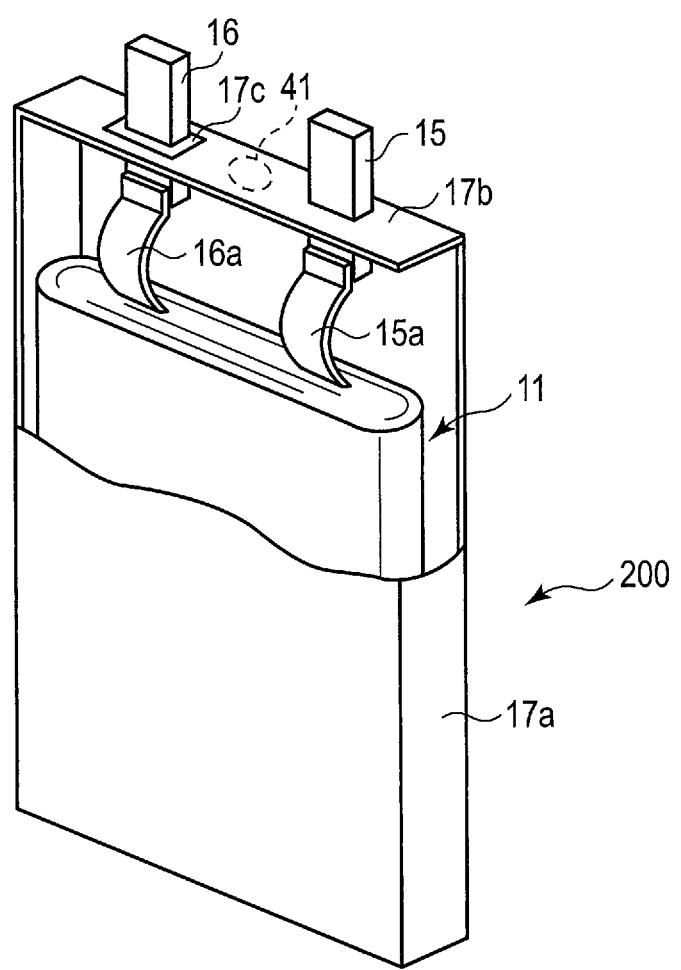
FIG. 3 is a partially cutaway perspective view of a nonaqueous electrolyte battery of the second example according to the first embodiment.

According to an embodiment, there is provided a nonaqueous electrolyte battery. The nonaqueous electrolyte battery includes a container member, a positive electrode stored in the container member, a negative electrode stored in the container member, and a nonaqueous electrolyte stored in the container member. The positive electrode contains, as a positive electrode active material, a lithium containing nickel cobalt manganese composite oxide represented by $Li_{1-x}Ni_{1-a-b}Co_aMn_bO_2$ (that satisfies $-0.2 \leq x \leq 0.5$, $0 < a \leq 0.5$, and $0 < b \leq 0.5$). The negative electrode contains a lithium titanium composite oxide having a spinel structure as a negative electrode active material. A gas composition in the container member when a charge ratio of the nonaqueous electrolyte battery is set to 30%, and the nonaqueous electrolyte battery is left stand at 35° C. for 24 hrs satisfies $$0.02 \, (cc/g) \leq V_{H2} \leq 0.1 \, (cc/g) \quad (1)$$

$$0.05 \leq V_{C3H6} V_{CO} \leq 0.1 \quad (2)$$

$$1 \leq V_{CO} V_{H2} \leq 9 \quad (3)$$

where $V_{H2}$ is a hydrogen gas amount (cc) per 1 g of negative electrode, $V_{C3H6}$ is a propylene gas amount (cc) per 1 g of negative electrode, and $V_{CO}$ is a carbon monoxide gas amount (cc) per 1 g of negative electrode.

According to an embodiment, there is provided a battery pack. The battery pack includes a nonaqueous electrolyte battery of the embodiment.

Embodiments will now be described with reference to the accompanying drawings. Note that the same reference numerals denote common components throughout the embodiments, and a repetitive description thereof will be omitted. In addition, the drawings are schematic views configured to promote the description and understanding of the embodiments. Although some shapes, sizes, ratios, and the like are different from those in an actual device, the design of there can appropriately be changed in consideration of the following explanation and known techniques.

First Embodiment

To improve battery performance in a battery using a titanium containing compound such as a lithium titanate for the negative electrode, it is effective to dope a negative electrode active material with a dopant or increase the specific surface area of the negative electrode. In particular, when the specific surface area of the negative electrode is increased, the characteristic can be expected to improve because the reaction area of the negative electrode becomes large. However, when the reaction area of the negative electrode increases, a side reaction on the electrode-nonaqueous electrolyte interface increases. When the side reaction on the negative electrode increases, the reductive reaction of a lithium compound contained in the nonaqueous electrolyte is promoted, and lithium fluoride (LiF) is generated. LiF existing on the electrode impedes insertion of lithium into the active material and serves as a resistance component. The reductive reaction formula of an F containing lithium compound such as $LiPF_6$ is

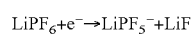

$$LiPF_6 + e^- \rightarrow LiPF_5^- + LiF$$

When the specific surface area of the negative electrode increases, water that is an inevitable impurity contained in the nonaqueous electrolyte battery tends to increase. The water contained in the battery is electrolyzed by an electrode reaction during the battery operation to generate hydrogen and oxygen. For this reason, if a large amount of water remains in the negative electrode, the generation amount of a gas derived from the water adhered to the negative electrode increases during the battery operation, and battery swelling becomes large. If the gas exists on the surface of the electrode active material, the portion does not come into contact with the nonaqueous electrolyte. Hence, the electrode reaction field decreases, and the battery resistance increases.

In the negative electrode during the battery operation, not only the reductive reaction of water or carbon dioxide, which is a carried-in impurity, but also reduction of a solvent component of the nonaqueous electrolytic solution occurs on the electrode surface, and a reduction product derived from the electrolytic solution is generated. The reductive reaction of water generates hydrogen ($H_2$) and oxygen ($O_2$). For example, when propylene carbonate is used as the solvent of the electrolytic solution, a propylene gas is generated, and when ethylene carbonate is used, an ethylene gas is generated, as is known.

In the positive electrode, the oxidation reaction of the reduction product occurs. A hydrogen gas ($H_2$) and an oxygen gas ($O_2$) are oxidized to generate water, and carbon monoxide is oxidized to generate carbon dioxide. At this time, the reduction product that cannot completely be oxidized in the positive electrode stays as a gas in the battery and causes swelling of the battery cell. The gas oxidation capability of the positive electrode can vary depending on the composition of the positive electrode. In addition, the type of the gas to be generated can be influenced by the solvent composition in the nonaqueous electrolyte. Due to these factors, the composition and the existence amount of the gas in the battery can vary.

To suppress the side reaction of the lithium compound contained in the nonaqueous electrolyte, an attempt to, for example, coat the electrode active material or add an additive to the nonaqueous electrolyte is made. However, the effect is not sufficient.

According to the first embodiment, there is provided a nonaqueous electrolyte battery including a container member, a positive electrode, a negative electrode, and a nonaqueous electrolyte. The positive electrode is stored in the container member and contains, as a positive electrode active material, a lithium containing nickel cobalt manganese composite oxide represented by $Li_{1-x}Ni_{1-a-b}Co_aMn_bO_2$ (that satisfies $-0.2 \le x \le 0.5$, $0 < a \le 0.5$, $0 < b \le 0.5$, and $0 < 1-a-b < 1$). The negative electrode is stored in the container member and contains a spinel type lithium titanate as a negative electrode active material. The nonaqueous electrolyte is stored in the container member. When the charge ratio of the nonaqueous electrolyte battery is adjusted to 30%, and the nonaqueous electrolyte battery is left stand at 35° C. for 24 hrs, the gas composition in the container member satisfies $$0.02 \text{ (cc/g)} \le V_{H2} \le 0.1 \text{ (cc/g)} \quad (1)$$

$$0.05 \le V_{C3H6}/V_{CO} \le 0.1 \quad (2)$$

$$1 \le V_{CO}/V_{H2} \le 9 \quad (3)$$

where $V_{H2}$ is the hydrogen gas amount (cc) per 1 g of negative electrode, $V_{C3H6}$ is the propylene gas amount (cc) per 1 g of negative electrode, and $V_{CO}$ is the carbon monoxide gas amount (cc) per 1 g of negative electrode. Here, the weight of the negative electrode is the weight of a negative electrode mixture layer. The negative electrode mixture layer is a porous layer containing the negative electrode active material.

Here, the charge ratio is also called an SOC (State Of Charge), which is 100% in full charge and is 0% in complete discharge. In a case of a nonaqueous electrolyte battery, charge is performed by a current and a voltage designated by the manufacturer. For example, in a case of a nonaqueous electrolyte battery including a positive electrode containing, as an active material, a lithium containing nickel cobalt manganese composite oxide represented by $Li_{1-x}Ni_{1-a-b}Co_aMn_bO_2$ (that satisfies $-0.2 \le x \le 0.5$, $0 < a \le 0.5$, and $0 < b \le 0.5$), and a negative electrode containing a lithium titanate titanium with a spinel type crystal structure as an active material, constant-current constant-voltage charge is performed in which constant-current charge is performed at 1 C up to a full charge voltage, constant-voltage charge is then performed at 2.8 V, and the charge ends when the current value converges to 1/20 C. After a pause of 10 min, discharge is performed at 1 C up to 1.8 V, and the discharge capacity at this time is defined as the rated capacity. The ratio of the charged electrical quantity to the rated capacity is the charge ratio (SOC).

When the hydrogen gas amount $V_{H2}$ per 1 g of negative electrode after the charge ratio of the nonaqueous electrolyte battery is adjusted to 30%, and the nonaqueous electrolyte battery is then left stand at 35° C. for 24 hrs satisfies inequality (1), a predetermined amount of component that changes to hydrogen when gasifies due to a reductive reaction exists in the battery. Examples of components that change to hydrogen when gasify include proton, carbonic acid, and propylene glycol. Hydrogen ($H_2$) generated from these exists in the negative electrode. The hydrogen (gas) can adhere to the surfaces of active material particles in the negative electrode and exist in the interfaces between the nonaqueous electrolyte and the negative electrode active material particle surfaces. As a result, side reactions, for example, the decomposition reaction of the nonaqueous electrolyte such as $LiPF_6$ and a reaction that carbonic acid or the like forms a coat on the negative electrode surface can be suppressed. In addition, when the hydrogen exists, an electrolysis reaction of water can be suppressed because of a chemical equilibrium, and gasification of a nonaqueous electrolyte such as carbonic acid or propylene glycol can be suppressed.

If the hydrogen gas amount $V_{H2}$ per 1 g of negative electrode exceeds 0.1 (cc/g), diffusion of lithium or lithium ions is impeded by the hydrogen gas along with the progress of the reductive reaction, and therefore, the capacity lowers, or the resistance increases. In a case in which the hydrogen gas amount $V_{H2}$ is less than 0.02 (cc/g), the amount of hydrogen existing on the negative electrode is small, and therefore, it may be impossible to suppress generation of LiF and generation of a coat. A more preferable range of inequality (1) is the range of 0.04 (cc/g) (inclusive) to 0.08 (cc/g) (inclusive).

The ratio ($V_{C3H6}/V_{CO}$) of the propylene gas amount $V_{C3H6}$ to the carbon monoxide gas amount $V_{CO}$ after the nonaqueous electrolyte battery is adjusted to a charge ratio of 30% and then left stand at 35° C. for 24 hrs defines the relationship between the gas generation amount by the reductive decomposition to the nonaqueous electrolyte on the negative electrode and the gas generation amount by the decomposition of water. The carbon monoxide is derived from the decomposition of an impurity or nonaqueous electrolyte, and the propylene gas is derived from the decomposition of propylene carbonate that is the solvent of the liquid nonaqueous electrolyte. If the ratio ($V_{C3H6}/V_{CO}$) is less than 0.05, a large amount of impurity derived from the nonaqueous electrolyte and the like is contained. On the other hand, if the ratio ($V_{C3H6}/V_{CO}$) exceeds 0.1, the decomposition of the nonaqueous electrolyte has progressed. If the ratio ($V_{C3H6}/V_{CO}$) satisfies inequality (2), the decomposition of the nonaqueous electrolyte is suppressed, and the amount of impurity is small. A more preferable range of inequality (2) is the range of 0.06 (inclusive) to 0.08 (inclusive).

If the ratio ($V_{CO}/V_{H2}$) of the carbon monoxide gas amount $V_{CO}$ per 1 g of negative electrode to the hydrogen gas amount $V_{H2}$ per 1 g of negative electrode after the nonaqueous electrolyte battery is adjusted to a charge ratio of 30% and then left stand at 35° C. for 24 hrs is less than 1, the hydrogen gas amount is larger than the carbon monoxide gas amount in the battery. This is because the amount of water mixed into the battery is large, and therefore, the electrolysis of water on the negative electrode progresses, and a large amount of hydrogen gas is generated. If the ratio ($V_{CO}/V_{H2}$) exceeds 9, this suggests that the carbon monoxide gas amount is larger than the hydrogen gas amount, and a large amount of gas is generated by the decomposition of the nonaqueous electrolyte on the negative electrode. A preferable range of inequality (3) is the range of 1 (inclusive) to 8 (inclusive), and a more preferable range of inequality (3) is the range of 4 (inclusive) to 6 (inclusive).

In a case in which relational expressions (1) to (3) are satisfied, substances that can change to hydrogen when gasify, carbon monoxide, the propylene gas, and the hydrogen gas exist at a desired ratio in the battery. It is therefore possible to suppress the reductive decomposition of the nonaqueous electrolyte such as LiF formation on the native electrode, electrolysis of water, and coat formation.

Examples of the substances that can change to hydrogen when gasify include carbonic acid ($H_2CO_3$), and propylene glycol ($C_3H_6(OH)_2$), and the like. When these substances coexist with a predetermined amount of hydrogen, they do not exist as a coat of lithium carbonate or the like on the negative electrode and exist in a state in which they are not fixed. In a case in which the above-described relational expressions are not satisfied, the carbonic acid and the propylene glycol readily change to a carbon dioxide gas and a propylene gas, and the battery resistance or the gas generation amount increases.

Hence, since the increase in the battery resistance and battery swelling can be suppressed by satisfying inequalities (1) to (3), it is possible to implement a nonaqueous electrolyte battery with excellent output performance.

$V_{H2}$, $V_{C3H6}$, and $V_{CO}$ are measured by, for example, gas chromatography. More specifically, a gas extracted from the battery is analyzed by a gas chromatograph (GC-2014 available from Shimadzu Corporation or a device having equivalent functions). As for the measurement conditions of $V_{H2}$ and $V_{CO}$, detection is performed using a column (MS5A), an injection temperature of 140° C., a detector temperature of 140° C., Ar as a carrier gas, and a flow rate of 23 ml/min. On the other hand, for $V=_6$, detection is performed using a column (Gaskuropack54), an injection temperature of 100° C., a detector temperature of 100° C., He as a carrier gas, and a flow rate of 40 ml/min.

A method of extracting a gas from the nonaqueous electrolyte battery will be described below.

First, the nonaqueous electrolyte battery is adjusted to a charge ratio of 30% and then left stand at 35° C. for 24 hrs. Note that the leaving under these conditions is done for the nonaqueous electrolyte battery after the manufacture (that is, after the shipping) and is different from aging performed in the manufacturing process before the shipping. Next, a check valve is opened, and a gas is collected using a syringe. Alternatively, a hole may be formed in a gas exhaust valve, and then, a syringe may be inserted to extract a gas under an argon atmosphere. After that, the through hole is sealed by an epoxy resin.

The nonaqueous electrolyte battery according to the first embodiment will be described next in more detail.

The nonaqueous electrolyte battery according to the first embodiment includes a negative electrode, a positive electrode, and a nonaqueous electrolyte.

The negative electrode can include a negative electrode current collector, and a negative electrode mixture layer formed on the negative electrode current collector.

The negative electrode current collector can include a portion that does not carry the negative electrode mixture layer on the surface. This portion can function as a negative electrode tab. Alternatively, the negative electrode can further include a negative electrode tab separated from the negative electrode current collector.

The negative electrode mixture layer contains a negative electrode active material. In addition, the negative electrode mixture layer can further contain a conductive agent and a binder, as needed.

The positive electrode can include a positive electrode current collector, and a positive electrode mixture layer formed on the positive electrode current collector.

The positive electrode current collector can include a portion that does not carry the positive electrode mixture layer on the surface. This portion can function as a positive electrode tab. Alternatively, the positive electrode can further include a positive electrode tab separated from the positive electrode current collector.

The positive electrode mixture layer contains a positive electrode active material. The positive electrode mixture layer can further contain a conductive agent and a binder, as needed.

The positive electrode and the negative electrode can form an electrode group. For example, in the electrode group, the positive electrode mixture layer and the negative electrode mixture layer can face each other with a separator in between. The structure of the electrode group is not particularly limited, and various structures can be used. For example, the electrode group can have a stacked structure. The electrode group of the stacked structure is obtained by, for example, stacking plural of positive electrodes and negative electrodes with separators inserted between the positive electrode mixture layers and the negative electrode mixture layers. Alternatively, the electrode group can have, for example, a wound structure. The electrode group of the wound structure is obtained by, for example, stacking one separator, one positive electrode, one more separator, and one negative electrode in this order to form a stacked body and winding the stacked body such that the outermost layer is the negative electrode.

The nonaqueous electrolyte battery can further include a negative electrode terminal and a positive electrode terminal. When a part of the negative electrode terminal is electrically connected to a part of the negative electrode, the negative electrode terminal can function as a conductor used to move electrons between the negative electrode and an external terminal. The negative electrode terminal can be connected to, for example, the negative electrode current collector and, particularly, to the negative electrode tab. Similarly, when a part of the positive electrode terminal is electrically connected to a part of the positive electrode, the positive electrode terminal can function as a conductor used to move electrons between the positive electrode and an external circuit. The positive electrode terminal can be connected to, for example, the positive electrode current collector and, particularly, to the positive electrode tab.

The nonaqueous electrolyte battery according to the first embodiment can further include a container member. The container member can store the electrode group and the nonaqueous electrolyte. The nonaqueous electrolyte can be impregnated in the electrode group in the container member. A part of each of the positive electrode terminal and the negative electrode terminal can be extended from the container member.

The negative electrode, the positive electrode, the nonaqueous electrolyte, the separator, the positive electrode terminal, the negative electrode terminal, and the container member will be described below in more detail.

(1) Negative Electrode

As the negative electrode current collector, a sheet containing a material with a high electrical conductivity can be used. For example, as the negative electrode current collector, an aluminum foil or an aluminum alloy foil can be used. When the aluminum foil or the aluminum alloy foil is used, the thickness is preferably 20 μm or less. The aluminum alloy foil can contain magnesium, zinc, silicon, or the like. In addition, the content of a transition metal such as iron, copper, nickel, or chromium contained in the aluminum alloy foil is preferably 1% or less.

The negative electrode mixture layer of the negative electrode contains, as a negative electrode active material, a lithium titanium composite oxide having a spinel structure. The lithium titanium composite oxide having a spinel structure contains $Li_{4+a}Ti_5O_{12}$ (the molar ratio a can change within the range of 0 (inclusive) to 3 (inclusive) depending on the charge-and-discharge state). As the active material of the negative electrode, an active material other than the lithium titanium composite oxide having a spinel structure may be contained. The examples can include a monoclinic titanium dioxide ($Li_xTiO_2(B)$ (the molar ratio x changes within the range of 0 (inclusive) to (inclusive) depending on the charge-and-discharge state)), a lithium titanium composite oxide having a ramsdellite structure ($Li_{2+x}Ti_3O_7$ (the molar ratio x changes within the range of 0 (inclusive) to 2 (inclusive) depending on the charge-and-discharge state)), and a monoclinic niobium titanium composite oxide (for example, $Li_xNb_2TiO_7$ (the molar ratio x changes within the range of 0 (inclusive) to 4 (inclusive) depending on the charge-and-discharge state). One type of negative electrode active material or two or more types can be used.

The ratio of the lithium titanium composite oxide having a spinel structure in the negative electrode active material is preferably 30 wt % (inclusive) to 100 wt % (inclusive).

The negative electrode active material containing the lithium titanium composite oxide having a spinel structure can be contained as particles in the negative electrode mixture layer. The average primary particle size if the negative electrode active material particles is preferably 5 μm or less. When the average primary particle size is 5 μm or less, a sufficient effective area contributing to the electrode reaction can be ensured, and satisfactory large current discharge performance can be obtained in the nonaqueous electrolyte battery.

The negative electrode conductive agent is used as needed to raise the current collection performance. The negative electrode conductive agent is, for example, a carbon material. The carbon material preferably has high alkali metal insertion performance and a high conductivity. The carbon material is, for example, acetylene black, carbon black, or graphite. One type of conductive agent or two or more types can be used.

The binder contained in the negative electrode may used to couple the negative electrode active material particles and the negative electrode current collector. The binder can contain, for example, polytetrafluoroethylene (PTFE), polyvinylidene fluoride, fluorine-based rubber, styrene-butadiene rubber (SBR), polypropylene (PP), polyethylene (PE), or carboxymethylcellulose (CMC). One type of binder or two or more types can be used.

The ratios of the negative electrode active material, the negative electrode conductive agent, and the binder contained in the negative electrode mixture layer are preferably 70 wt % to 95 wt %, 0 wt % to 25 wt %, and 2 wt % to 10 wt %, respectively.

The specific surface area of the negative electrode measured by the BET method with $N_2$ absorption may range from 2.5 $m^2/g$ (inclusive) to 20 $m^2/g$ (inclusive) or may range from 3.5 $m^2/g$ (inclusive) to 20 $m^2/g$ (inclusive).

The specific surface area of the negative electrode measured by the BET method with $N_2$ absorption preferably ranges from 4 $m^2/g$ (inclusive) to 20 $m^2/g$ (inclusive). This can enhance the effect of suppressing the battery resistance and the battery swelling. Here, the weight of the negative electrode is the weight of the negative electrode mixture layer and does not include the current collector.

The method of measuring the specific surface area of the negative electrode by the BET method with $N_2$ absorption is as follows. Two 2×2 $cm^2$ pieces (pieces including the negative electrode mixture layer and the negative electrode current collector) are cut from the negative electrode as samples. As the BET specific surface area measuring device, a device available from Yuasa Ionics or a device having equivalent functions is used. A nitrogen gas is used as an absorption gas.

The negative electrode can be produced in accordance with, for example, the following procedure. First, the negative electrode active material, the conductive agent, and the binder are put in an appropriate solvent, for example, N-methyl pyrrolidone to prepare a slurry. The slurry is applied to the surface of the negative electrode current collector, and the coating is dried. The slurry may be applied to only one surface of the negative electrode current collector. Alternatively, the slurry may be applied to both one surface of the negative electrode current collector and the surface on the opposite side. The dried coating is pressed to form a negative electrode mixture layer having a desired density, thereby completing a negative electrode.

(2) Positive Electrode

As the positive electrode current collector, a sheet containing a material with a high electrical conductivity can be used. For example, as the positive electrode current collector, an aluminum foil or an aluminum alloy foil can be used. When the aluminum foil or the aluminum alloy foil is used, the thickness is preferably 20 μm or less. The aluminum alloy foil can contain magnesium, zinc, silicon, or the like. In addition, the content of a transition metal such as iron, copper, nickel, or chromium contained in the aluminum alloy foil is preferably 1% or less.

The positive electrode mixture layer contains, as a positive electrode active material, a lithium containing nickel cobalt manganese composite oxide represented by $Li_{1-x}Ni_{1-a-b}Co_aMn_bO_2$ (that satisfies $-0.2 \leq x \leq 0.5$, $0 < a \leq 0.5$, and $0 < b \leq 0.5$). The molar ratio x can vary due to insertion/extraction of lithium ions. The molar ratio x tends to become large along with the progress of charge, and tends to become small along with the progress of discharge.

The molar ratio a of Co is set to 0.5 or less to ensure the thermal stability as an active material, and the molar ratio b of Mn is set to 0.5 or less to ensure the discharge capacity.

The ratio of $Li_{1-x}Ni_{1-a-b}Co_aMn_bO_2$ in the positive electrode active material is preferably 10 wt % (inclusive) to 100 wt % (inclusive). This can improve the gas absorption performance of the positive electrode.

As the positive electrode active material, both $Li_{1-x}Ni_{1-a-b}Co_aMn_bO_2$ and a positive electrode active material other than that can be used. Examples include a lithium nickel composite oxide (for example, $LiNiO_2$), a lithium cobalt composite oxide ($LiCoO_2$), a lithium nickel cobalt composite oxide (for example, $LiNi_{1-x}Co_xO_2$, $0<x<1$), a lithium manganese cobalt composite oxide (for example, $LiMn_xCo_{1-x}O_2$, $0<x<1$), a lithium iron phosphate ($LiFePO_4$) with an olivine structure, and the like. One type of active material or two or more types can be used.

The positive electrode conductive agent is used as needed to raise the current collection performance. The positive electrode conductive agent is, for example, acetylene black, carbon black, or graphite. One type of conductive agent or two or more types can be used.

The binder contained in the positive electrode is used to couple the positive electrode active material and the positive electrode current collector. Examples of binders that can be contained in the positive electrode are polytetrafluoroethylene (PTFE), polyvinylidene fluoride (PVdF), fluorine-based rubber, styrene-butadiene rubber (SBR), polypropylene (PP), polyethylene (PE), or carboxymethylcellulose (CMC). One type of binder or two or more types can be used.

The ratios of the positive electrode active material, the positive electrode conductive agent, and the binder contained in the positive electrode mixture layer are preferably 80 wt % to 95 wt %, 3 wt % to 20 wt %, and 2 wt % to 7 wt %, respectively.

The specific surface area of the positive electrode measured by the BET method with $N_2$ absorption ranges from, for example, 2.5 $m^2/g$ (inclusive) to 25 $m^2/g$ (inclusive). The lower limit value of the specific surface area can be 3.5 $m^2/g$. The upper limit value of the specific surface area can be 20 $m^2/g$. When the specific surface area ranges from 3.5 $m^2/g$ (inclusive) to 20 $m^2/g$ (inclusive), it is possible to enhance the effect of suppressing the battery resistance and the battery swelling.

The specific surface area of the positive electrode measured by the BET method with $N_2$ absorption preferably ranges from 15 $m^2/g$ (inclusive) to 25 $m^2/g$ (inclusive). This can enhance the effect of suppressing the battery resistance and the battery swelling. Here, the weight of the positive electrode is the weight of the positive electrode mixture layer and does not include the current collector.

The specific surface area of the negative electrode ($NE_S$) and the specific surface area of the positive electrode ($PE_S$) described above preferably satisfy the relationship given by $$0 \leq |(NE_S - PE_S)/NE_S| \leq 0.5 \quad (A)$$

That is, the absolute value of a value obtained by dividing a value obtained by subtracting the positive electrode specific surface area ($PE_S$) from the negative electrode specific surface area ($NE_S$) by the negative electrode specific surface area ($NE_S$) preferably falls within the range of 0 (inclusive) to 0.5 (inclusive).

If the absolute value given by inequality (A) exceeds 0.5, the oxidation reaction in the positive electrode excessively occurs with respect to the reductive reaction in the negative electrode. Hence, $V_{H2}$ tends to be too small, and $V_{CO}/V_{H2}$ tends to be too large. Alternatively, if the absolute value exceeds 0.5, the reductive reaction in the negative electrode excessively occurs with respect to the oxidation reaction in the positive electrode. Hence, $V_{H2}$ tends to be too large. Note that the absolute value given by inequality (A) never takes a value less than 0 because it is an absolute value.

The method of measuring the specific surface area of the positive electrode by the BET method with $N_2$ absorption is as follows. Two 2×2 $cm^2$ pieces (pieces including the positive electrode mixture layer and the positive electrode current collector) are cut from the positive electrode as samples. As the BET specific surface area measuring device, a device available from Yuasa Ionics or a device having equivalent functions is used. A nitrogen gas is used as an absorption gas.

The positive electrode can be produced in accordance with, for example, the following procedure. First, the positive electrode active material, the conductive agent, and the binder are put in an appropriate solvent, for example, N-methyl pyrrolidone to prepare a slurry. The slurry is applied to the surface of the positive electrode current collector, and the coating is dried. The slurry may be applied to only one surface of the positive electrode current collector. Alternatively, the slurry may be applied to both one surface of the positive electrode current collector and the surface on the opposite side. The dried coating is pressed to form a positive electrode mixture layer having a desired density, thereby completing a positive electrode.

(3) Separator

The separator is, for example, a nonwoven fabric made of a synthetic resin, a porous film made of polyolefin, for example, a porous film made of polyethylene or a porous film made of polypropylene, or a cellulose-based separator. In addition, a separator with a composite of these materials, for example, a separator including a porous film made of polyolefin and a cellulose can be used.

The separator preferably includes holes with a diameter of 10 μm (inclusive) to 100 μm (inclusive). In addition, the thickness of the separator is preferably 2 μm (inclusive) to 30 μm (inclusive).

(4) Nonaqueous Electrolyte

The nonaqueous electrolyte contains, for example, a nonaqueous solvent and an electrolyte dissolved in the nonaqueous solvent.

The nonaqueous solvent may be a known nonaqueous solvent used in a nonaqueous electrolyte battery. First examples of the nonaqueous solvent are cyclic carbonates such as an ethylene carbonate (EC) and a propylene carbonate (PC). Second examples of the nonaqueous solvent are chain carbonates such as dimethyl carbonate (DMC), methyl ethyl carbonate (MEC), and diethyl carbonate (DEC); γ-butyrolactone (γ-BL), acetonitrile, methyl propionate, ethyl propionate; cyclic ethers such as tetrahydrofuran (THF) and 2-methyltetrahydrofuran; and chain ethers such as dimethoxyethane and diethoxyethane. The solvents of the second examples generally each have a viscosity lower than those of the solvents of the first examples. In addition, the nonaqueous solvent may be a solvent obtained by mixing a solvent of the first examples and a solvent of the second examples described above.

A preferable nonaqueous solvent contains a propylene carbonate. A more preferable nonaqueous solvent contains one type of chain carbonate or two or more types of chain carbonates.

The electrolyte is, for example, an alkali salt and, preferably, a lithium salt. The electrolyte preferably contains a lithium salt containing F. Examples of the lithium salt are a lithium hexafluorophosphate ($LiPF_6$), a Lithium hexafluoroarsenate (LiAsF$_6$), and a lithium trifluoromethanesulfonate (LiCF$_3$SO$_3$). One type of electrolyte or two or more types can be used. A lithium hexafluorophosphate (LiPF$_6$) is preferably used. The concentration of the electrolyte in the nonaqueous electrolyte is preferably 0.5 to 2 mol/L.

(5) Negative Electrode Terminal and Positive Electrode Terminal

The negative electrode terminal and the positive electrode terminal are preferably made of a material with a high electrical conductivity. When connecting to current collectors, to reduce the contact resistance, these terminals are preferably made of the same material as the current collectors.

(6) Container Member

As the container member, for example, a metal container or a container made of a laminated film can be used. However, it is not particularly limited.

When a metal container is used as the container member, a nonaqueous electrolyte battery with an excellent shock resistance and long-term reliability can be implemented. When a container made of a laminated film is used as the container member, a nonaqueous electrolyte battery with an excellent corrosion resistance can be implemented. In addition, the weight of the nonaqueous electrolyte battery can be reduced.

As the metal container, for example, a container whose thickness falls within the range of 0.2 to 5 mm can be used. The thickness of the metal container is preferably 0.5 mm or less.

The metal container preferably contains at least one type of element selected from the group consisting of Fe, Ni, Cu, Sn, and Al. The metal container can be made of, for example, aluminum or an aluminum alloy. The aluminum alloy is preferably an alloy containing an element such as magnesium, zinc, silicon, or the like. In a case in which a transition metal such as iron, copper, nickel, or chromium is contained in the alloy, the content is preferably 1 wt % or less. This can dramatically improve the long-term reliability and the shock resistance under a high-temperature environment.

As the container made of laminated film, for example, a container whose thickness falls within the range of 0.1 to 2 mm can be used. The thickness of the laminated film is preferably 0.2 mm or less.

The laminated film is formed by a multilayered film including, for example, a metal layer and resin layers sandwiching the metal layer. The metal layer preferably contains at least one type of metal selected from the group consisting of Fe, Ni, Cu, Sn, and Al. The metal layer is preferably an aluminum foil or an aluminum alloy foil to reduce the weight. For the resin layer, for example, a polymer material such as polypropylene (PP), polyethylene (PE), nylon, or polyethylene terephthalate (PET) can be used. The laminated film can be formed into the shape of the container member by sealing using heat seal.

Examples of the shape of the container member are a flat shape (thin shape), a rectangular shape, a cylindrical shape, a coin shape, and a button shape. The container member can have various dimensions depending on the application purpose. For example, when the nonaqueous electrolyte battery according to the first embodiment is used in a portable electronic device, the container member can be compact in accordance with the size of the electronic device in which the battery is mounted. In a case of a nonaqueous electrolyte battery mounted in an automobile such a two- or four-wheeled vehicles, the container can be a large battery container.

A first nonaqueous electrolyte battery is manufactured by, for example, a method to be described below. In a nonaqueous electrolyte battery including a positive electrode containing, as a positive electrode active material, a lithium containing nickel cobalt manganese composite oxide represented by Li$_{1-x}$Ni$_{1-a-b}$Co$_a$Mn$_b$O$_2$ (that satisfies $-0.2 \le x \le 0.5$, $0<a \le 0.5$, $0<b \le 0.5$, and $0<b \le 0.5$) and a negative electrode containing, as a negative electrode active material, a lithium titanium composite oxide having a spinel structure, adjustment of the specific surface areas of the positive electrode and/or the negative electrode, adjustment of the compositions of mixture layers, adjustment of the composition of a nonaqueous electrolyte, addition of a hydrogen gas to the nonaqueous electrolyte, and adjustment of the aging condition of the nonaqueous electrolyte battery are performed, thereby obtaining a nonaqueous electrolyte battery in which the gas composition in the container member after the nonaqueous electrolyte battery is adjusted to a charge ratio of 30% and then left stand at 35° C. for 24 hrs satisfies inequalities (1) to (3).

Here, the specific surface areas of the positive electrode and the negative electrode are effective in adjusting the balance between the gas generation amount from the negative electrode and the gas consumption amount in the positive electrode. Increasing the specific surface area of the positive electrode is effective in increasing the gas consumption amount in the positive electrode. In addition, when the specific surface area of the negative electrode is made small, the gas generation amount from the negative electrode can be decreased.

When a nonaqueous electrolyte containing a propylene carbonate containing solvent is used as the nonaqueous electrolyte, control of the amount of a C$_3$H$_6$ gas is facilitated.

To control the hydrogen gas amount, processing to the described later may be executed. After a hydrogen gas is bubbled into the nonaqueous electrolyte at a predetermined flow rate, the nonaqueous electrolyte is placed under a reduced pressure, thereby adjusting the amount of the hydrogen gas in the nonaqueous electrolyte. Alternatively, a carbonic acid or propylene glycol is added to the electrolyte. Otherwise, a cell inserted into the outer can is left stand under a reduced pressure, and then left stand under a hydrogen gas atmosphere to make the electrodes to absorb the hydrogen gas. This facilitates control of the amount of the hydrogen gas.

When aging in which the nonaqueous electrolyte battery is adjusted to a charge ratio (SOC) of 80% (inclusive) to 100% (inclusive) and held at a temperature of 40° C. (inclusive) to 60° C. (inclusive) is performed, a hydrogen gas is generated, and this is effective in controlling the hydrogen gas amount. Adjustment of the charge ratio can be done by charge or by discharge. Aging is preferably performed at least after first charge is performed.

An example of the nonaqueous electrolyte battery to the embodiment will be in more detail with reference to the accompanying drawings.

FIG. 1 is a partially cutaway perspective view of a nonaqueous electrolyte battery of the first example according to the embodiment. FIG. 2 is an enlarged sectional view of a portion A of the nonaqueous electrolyte battery shown in FIG. 1.

A nonaqueous electrolyte battery 100 shown in FIGS. 1 and 2 includes a flat electrode group 1.

The flat electrode group 1 includes a negative electrode 2, a positive electrode 3, and a separator 4.

As shown in FIG. 2, the negative electrode 2 includes a negative electrode current collector 2a and a negative electrode mixture layer 2b carried on the negative electrode current collector 2a. As shown in FIG. 2, the positive electrode 3 includes a positive electrode current collector 3a and a positive electrode mixture layer 3b carried on the positive electrode current collector 3a.

As shown in FIG. 1, the electrode group 1 has a structure in which the negative electrode 2 and the positive electrode 3 are spirally wound into a flat shape with the separator 4 in between.

As shown in FIG. 1, in the nonaqueous electrolyte battery 100, a strip-shaped negative electrode terminal 5 is electrically connected to the negative electrode 2. More specifically, the negative electrode terminal 5 is connected to the negative electrode current collector 2a. In addition, a strip-shaped positive electrode terminal 6 is electrically connected to the positive electrode 3. More specifically, the positive electrode terminal 6 is connected to the positive electrode current collector 3a.

Additionally, the nonaqueous electrolyte battery 100 further includes an outer container 7 made of a laminated film and serving as a container. That is, the nonaqueous electrolyte battery 100 includes a container member formed by the outer container 7 made of the laminated film.

The electrode group 1 is stored in the outer container 7 made of the laminated film. The ends of the negative electrode terminal 5 and the positive electrode terminal 6 extend from the outer container 7. A nonaqueous electrolyte (not shown) is stored in the outer container 7 made of the laminated film. The nonaqueous electrolyte is impregnated in the electrode group 1. The peripheral portion of the outer container 7 is heat-sealed, thereby sealing the electrode group 1 and the nonaqueous electrolyte.

The second example of the nonaqueous electrolyte battery according to the first embodiment will be described next in detail with reference to FIG. 3.

FIG. 3 is a partially cutaway perspective view of the nonaqueous electrolyte battery of the second example according to the first embodiment.

A nonaqueous electrolyte battery 200 shown in FIG. 3 is different from the nonaqueous electrolyte battery 100 of the first example in that the container member is formed by a metal container 17a and a sealing plate 17b.

A flat electrode group 11 includes the negative electrode 2, the positive electrode 3, and the separator 4, like the electrode group 1 in the nonaqueous electrolyte battery 100 of the first example. In addition, the electrode group 11 have the same structure as the electrode group 1. In the electrode group 11, however, a negative electrode tab 15 and a positive electrode tab 16 are connected to the negative electrode 2 and the positive electrode 3 in place of the negative electrode terminal 5 and the positive electrode terminal 6, as will be described later.

In the nonaqueous electrolyte battery 200 shown in FIG. 3, the electrode group 11 is stored in the metal container 17a. The metal container 17a further stores a nonaqueous electrolyte. The metal container 17a is sealed by the sealing plate 17b made of a metal. The metal container 17a and the sealing plate 17b constitute an outer can serving as, for example, a container member.

One end of a negative electrode tab 15a is electrically connected to the negative electrode current collector 2a, and the other end is electrically connected to the negative electrode terminal 15. One end of a positive electrode tab 16a is electrically connected to the positive electrode current collector 3a, and the other end is electrically connected to the positive electrode terminal 16 fixed to the sealing plate 17b. The positive electrode terminal 16 is fixed to the sealing plate 17b via an insulating member 17c. The positive electrode terminal 16 and the sealing plate 17b are electrically insulated by the insulating member 17c.

Figure 4:
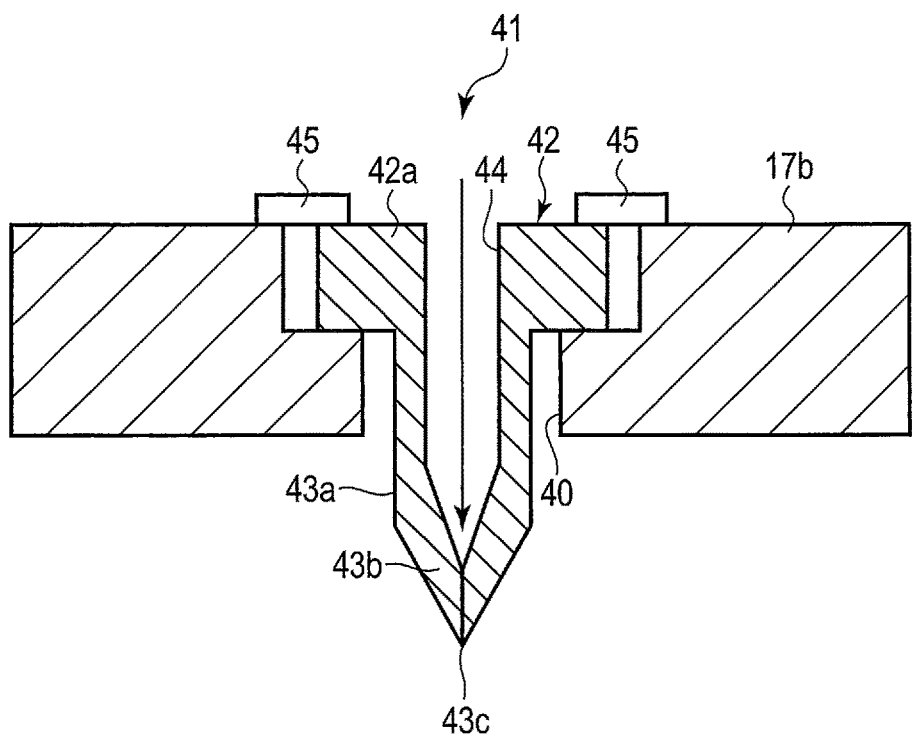
FIG. 4 is a sectional view of a portion including a check valve shown in FIG. 3 taken along the short side direction of a battery.
Figure 5:
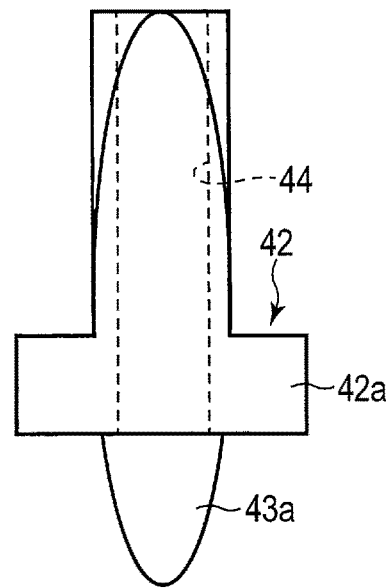
FIG. 5 is a sectional view of the portion including the check valve shown in FIG. 3 taken along the in-plane direction of a sealing plate.
Figure 6:
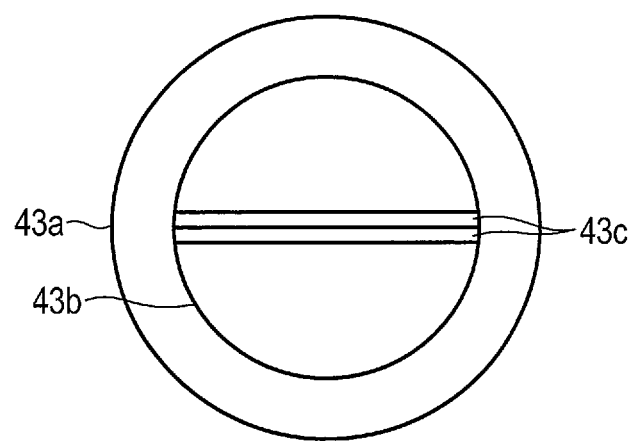
FIG. 6 is a plan view showing the distal end portion of the check valve shown in FIG. 3.

The nonaqueous electrolyte battery according to the embodiment may include a check valve capable of preventing the liquid in the container member from being discharged to the outside. This makes it possible to confirm the composition of the gas in the container member and continuously use the battery even after the confirmation. In a case of the nonaqueous electrolyte battery 200 shown in FIG. 3, a check valve 41 can be provided between the positive electrode terminal 16 and the negative electrode terminal 15 in the outer surface of the sealing plate 17b. When providing the check valve 41, as shown in FIG. 4, a through hole 40 is formed between the positive electrode terminal 16 and the negative electrode terminal 15 in the sealing plate 17b. The through hole 40 includes a large-diameter portion having a large diameter and a small-diameter portion having a small diameter. The small-diameter portion of the through hole 40 faces the inner surface side of the sealing plate 17b. As shown in FIGS. 4 and 5, the check valve 41 includes valve elements 43a and 43b, a support portion 42 that supports the valve elements, and a through hole 44 communicating with the support portion 42 and the valve elements 43a and 43b. The support portion 42 includes a projecting portion 42a inserted into the large-diameter portion of the through hole 40. On the other hand, the valve elements include the tubular portion 43a extending downward from the support portion 42 and surrounding the through hole 44, and the tapered distal end 43b extending downward from the tubular portion 43a and surrounding the through hole 44. As shown in FIG. 6, end faces 43c of the distal end 43b, which face each other, are in tight contact. This state represents a state in which the check valve 41 is closed. The check valve 41 is inserted into the through hole 40 of the sealing plate 17b, the projecting portion 42a of the support portion 42 is fitted in the large-diameter portion of the through hole 40, and the projecting portion 42a of the support portion 42 is fixed to the sealing plate 17b by bolts 45. The support portion 42 and the valve elements 43a and 43b are preferably made of a material that is not deteriorated by the nonaqueous electrolyte. In addition, the material of the valve elements 43a and 43b is preferably an elastic material such that after the force for opening the end faces 43c is canceled, the end faces 43c return to the tight contact state again. Hence, the material of the support portion 42 and the valve elements 43a and 43b is, for example, vinyl methyl silicone rubber.

To confirm the gas composition in the container member, an injection needle is inserted into the through hole 44 of the check valve 41 from the direction of an arrow shown in FIG. 4 and inserted between the end faces 43c, the check valve 41 opens, and the gas in the container member can be collected by the injection needle. After that, when the injection needle is removed, the facing end faces 43c come into tight contact again, and therefore, the airtightness of the battery can be maintained. In addition, if the check valve 41 is not forcibly opened from the side of the through hole 44, the check valve 41 cannot be set in the release state. It is therefore possible to avoid the liquid and the gas in the container member from leaking via the check valve 41.

The nonaqueous electrolyte battery according to the first embodiment described above includes a positive electrode containing, as a positive electrode active material, a lithium containing nickel cobalt manganese composite oxide represented by $Li_{1-x}Ni_{1-a-b}Co_aMn_bO_2$ (that satisfies $-0.2 \le x \le 0.5$, $0 < a \le 0.5$, and $0 < b \le 0.5$) and a negative electrode containing, as a negative electrode active material, a lithium titanium composite oxide having a spinel structure, and the gas composition in the container member after the charge ratio of the nonaqueous electrolyte battery is adjusted to 30%, and the nonaqueous electrolyte battery is left stand at 35° C. for 24 hrs satisfies inequalities (1) to (3). For this reason, the decomposition reaction of the nonaqueous electrolyte such as LiF formation on the negative electrode, electrolysis of water, and coat formation are suppressed, and an increase in the battery resistance and gas generation can be suppressed. It is therefore possible to implement a nonaqueous electrolyte battery with excellent output performance.

Second Embodiment

According to the second embodiment, there is provided a battery pack. The battery pack includes the nonaqueous electrolyte battery according to the first embodiment.

The battery pack according to the second embodiment can also include plural of nonaqueous electrolyte batteries. Plural of the nonaqueous electrolyte batteries can be electrically connected in series or can be electrically connected in parallel. Alternatively, plural of the nonaqueous electrolyte batteries can be connected in a combination of series connection and parallel connection.

For example, the battery pack according to the second embodiment can also include, for example, five or six first nonaqueous electrolyte batteries. These nonaqueous electrolyte batteries can be connected in series. The nonaqueous electrolyte batteries connected in series can form a battery module. That is, the battery pack according to the second embodiment can include a battery module.

The battery pack according to the second embodiment can include plural of battery modules. Plural of the battery modules can be connected in series, in parallel, or in a combination of series connection and parallel connection.

An example of the battery pack according to the second embodiment will be described below with reference to FIGS. 7 and 8.

Figure 7:
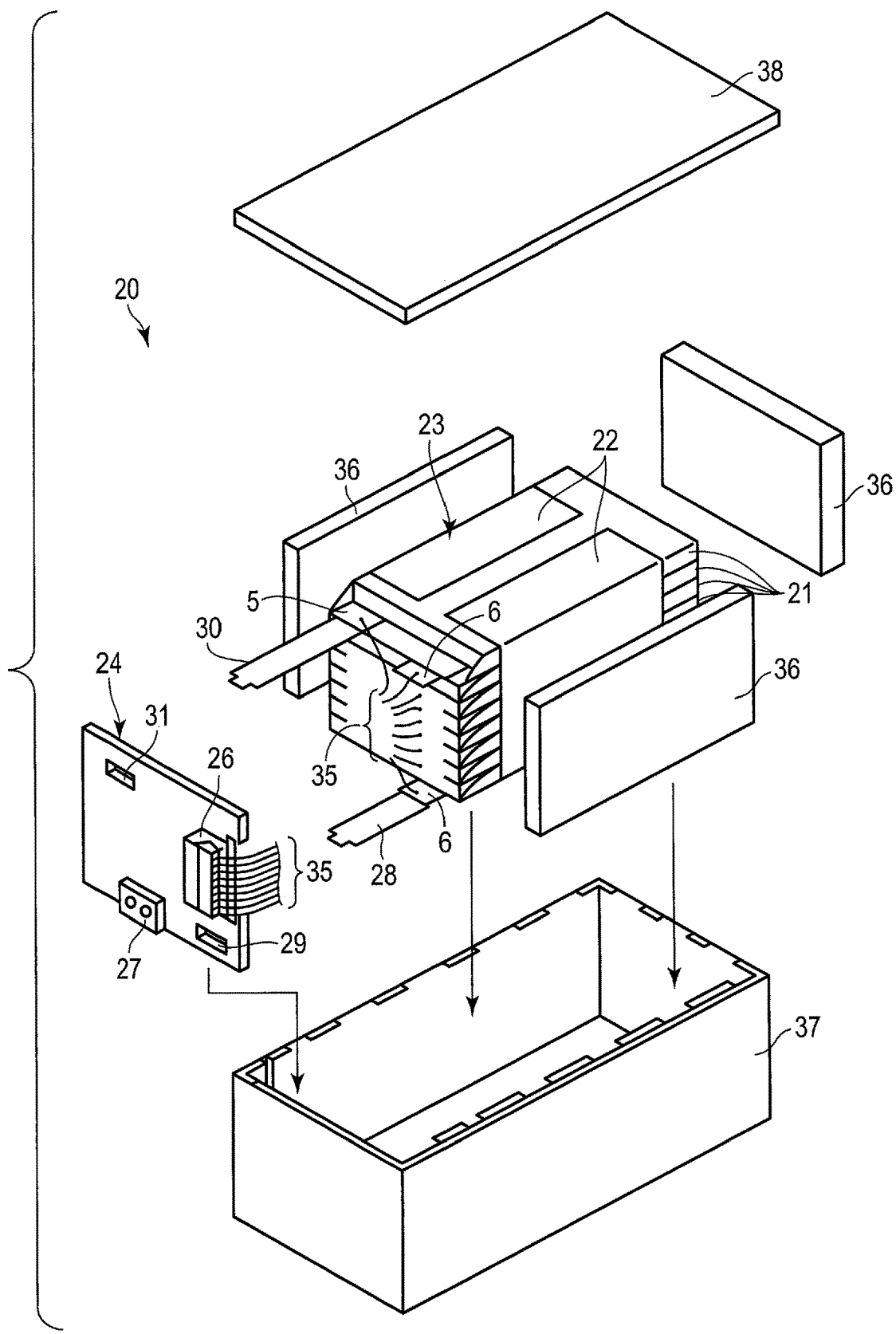
FIG. 7 is an exploded perspective view of a battery pack of an example according to the second embodiment.

FIG. 7 is an exploded perspective view of a battery pack of an example according to the second embodiment. FIG. 8 is a block diagram showing the electric circuit of the battery pack shown in FIG. 7.

Figure 8:
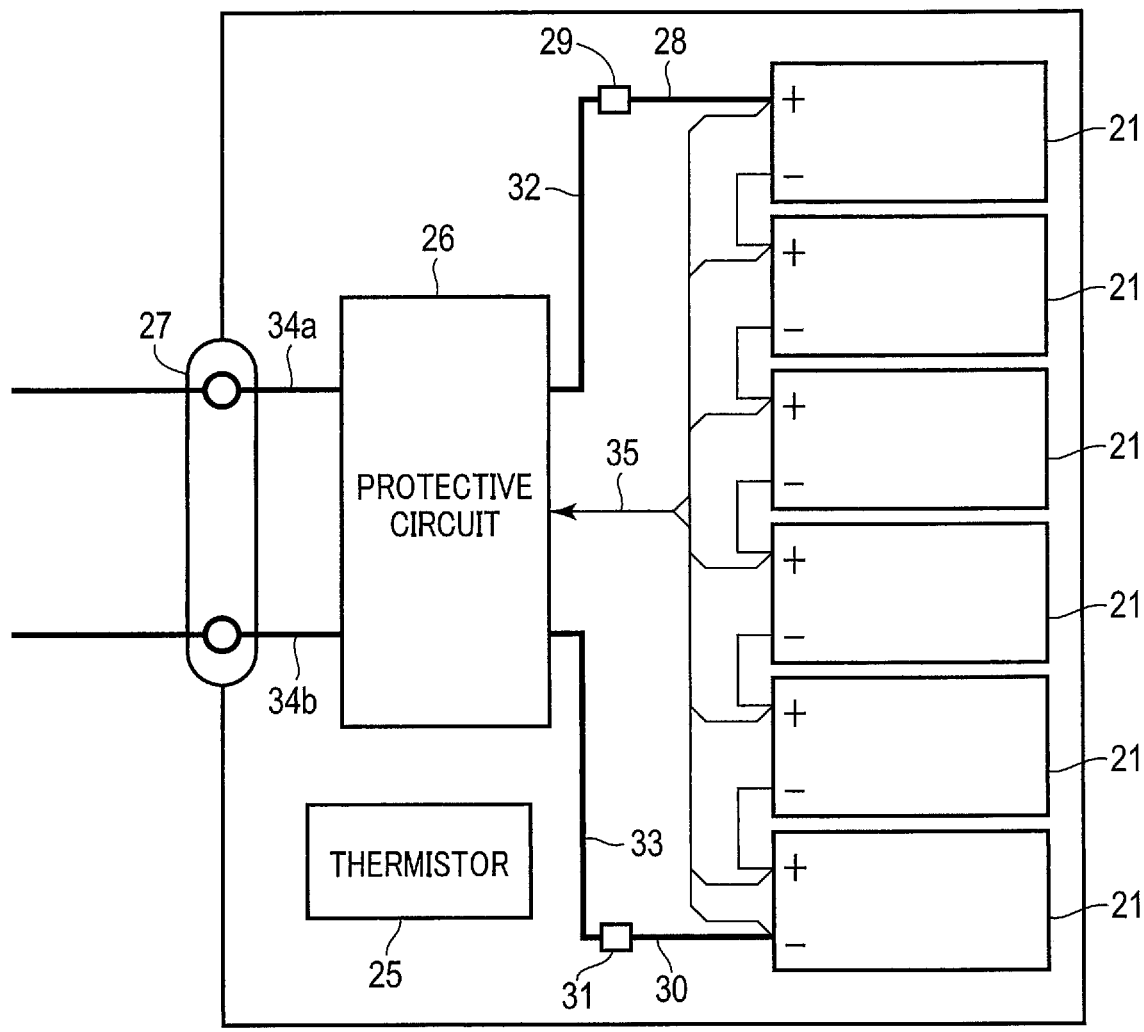
FIG. 8 is a block diagram showing the electric circuit of the battery pack shown in FIG. 7.

A battery pack 20 shown in FIGS. 7 and 8 includes plural of unit cells 21. The unit cell 21 can be the flat nonaqueous electrolyte battery 100 of an example according to the first embodiment described with reference to FIG. 1.

Plural of the unit cells 21 are stacked such that negative electrode terminals 5 and positive electrode terminals 6 extended to the outside are aligned in the same direction, and are fastened by an adhesive tape 22, thereby forming a battery module 23. The unit cells 21 are electrically connected in series with each other, as shown in FIG. 8.

A printed wiring board 24 is arranged to face the side surfaces of the unit cells 21 from which the negative electrode terminals 5 and the positive electrode terminals 6 extend. As shown in FIG. 8, a thermistor 25, a protective circuit 26, and an energizing terminal 27 to an external device are mounted on the printed wiring board 24. Note that an insulating plate (not shown) is attached to the surface of the printed wiring board 24 facing the battery module 23 to avoid unwanted connection to the wires of the battery module 23.

A positive electrode side lead 28 is connected to the positive electrode terminal 6 located in the lowermost layer of the battery module 23. The distal end of the positive electrode side lead 28 is inserted into a positive electrode side connector 29 of the printed wiring board 24 and electrically connected to the positive electrode side connector 29. A negative electrode side lead 30 is connected to the negative electrode terminal 5 located in the uppermost layer of the battery module 23. The distal end of the negative electrode side lead 30 is inserted into a negative electrode side connector 31 of the printed wiring board 24 and electrically connected to the negative electrode side connector 31. The connectors 29 and 31 are connected to the protective circuit 26 via wires 32 and 33 formed on the printed wiring board 24.

The thermistor 25 detects the temperature of the unit cells 21 and transmits the detection signal to the protective circuit 26. The protective circuit 26 can disconnect a positive side wire 34a and a negative side wire 34b between the protective circuit 26 and the energizing terminal 27 to an external device under a predetermined condition. The predetermined condition is that, for example, the temperature detected by the thermistor 25 is a predetermined temperature or more. Alternatively, the predetermined condition is, for example, detection of over-charge, over-discharge, or overcurrent of the unit cells 21. The detection of over-charge or the like is done for each unit cell 21 or the entire battery module 23. If the detection is performed for each unit cell 21, a battery voltage may be detected, or a positive electrode potential or negative electrode potential may be detected. In the latter case, a lithium battery to be used as a reference electrode is inserted into each unit cell 21. In the battery pack 20 case shown FIGS. 7 and 8, a wire 35 used to detect a voltage is connected to each unit cell 21. A detection signal is transmitted to the protective circuit 26 via the wire 35.

A protective sheet 36 made of rubber or a resin is arranged on each of three side surfaces of the battery module 23 except the side surface from which the positive electrode terminals 6 and the negative electrode terminals 5 project.

The battery module 23 is stored in a storage container 37 together with the protective sheets 36 and the printed wiring board 24. That is, the protective sheets 36 are arranged on both inner surfaces of the storage container 37 in the long-side direction and on an inner surface in the short-side direction. The printed wiring board 24 is arranged on the inner surface on the opposite side in the short-side direction. The battery module 23 is located in a space surrounded by the protective sheets 36 and the printed wiring board 24. A lid 38 is attached to the upper surface of the storage container 37.

Note that to fix the battery module 23, a heat-shrinkable tape may be used in place of the adhesive tape 22. In this case, the protective sheets are arranged on both side surfaces of the battery module, and the heat-shrinkable tape is wrapped and shrunk by heat to bind the battery module.

FIGS. 7 and 8 show a form in which the unit cells 21 are connected in series. However, the unit cells may be connected in parallel to increase the battery capacity. Furthermore, assembled battery packs may be connected in series and/or in parallel.

In addition, the form of the battery pack according to the second embodiment is appropriately changed in accordance with the application purpose. As the application purpose of the battery pack according to the second embodiment, an application purpose requiring cycle performance in large-current performance is preferable. As a detailed application purpose, the battery pack is used as a power supply for a digital camera or as an onboard battery for a two- or four-wheeled hybrid electric automobile, a two- or four-wheeled electric automobile, or an electric bicycle. The battery pack according to the second embodiment is particularly suitable for an onboard use.

The battery pack according to the second embodiment implement a low resistance, little battery swelling, and excellent output performance because it includes the nonaqueous electrolyte battery according to the first embodiment.

EXAMPLES

The embodiments will be described below in more detail based on examples.

Example 1

In Example 1, a nonaqueous electrolyte battery according to Example 1 was produced in accordance with the following procedure.

<Production of Positive Electrode>

$LiNi_{0.33}Co_{0.33}Mn_{0.33}O_2$ particles were prepared as a positive electrode active material, carbon black was prepared as a conductive agent, and polyvinylidene fluoride was prepared as a binder. These were mixed at a weight ratio of 90:5:5, thereby obtaining a mixture.

Next, the obtained mixture was dispersed in an N-methyl pyrrolidone (NMP) solvent to prepare a slurry. The obtained slurry was applied to an aluminum foil having a thickness of 20 μm and dried. Next, the dried coating was pressed to obtain a positive electrode. The specific surface area of the positive electrode measured by the BET method with $N_2$ absorption is shown in Table 1.

<Production of Negative Electrode>

$Li_4Ti_5O_{12}$ was prepared as a negative electrode active material, carbon black was prepared as a conductive agent, and polyvinylidene fluoride was prepared as a binder. These were mixed at a weight ratio of 90:5:5, thereby obtaining a mixture.

Next, the obtained mixture was dispersed in an N-methyl pyrrolidone (NMP) solvent to prepare a slurry. The obtained slurry was applied to an aluminum foil having a thickness of 20 μm and dried. Next, the dried coating was pressed. After that, drying was executed at 100° C. to obtain a negative electrode. The specific surface area of the negative electrode measured by the BET method with $N_2$ absorption is shown in Table 1.

<Assembly of Cell>

The positive electrode produced in the above-described way, a separator made of a polyethylene porous film having at thickness of 20 μm, the negative electrode produced in the above-described way, and one more separator were stacked in this order. The obtained stacked body was spirally wound such that the negative electrode was located at the outermost periphery, thereby creating an electrode group. This was pressed to obtain a flat electrode group. The flat electrode group was inserted into a can-shaped container (outer can) made of aluminum having a thickness of 0.3 mm and sealed by a lid body (sealing plate). A flat nonaqueous electrolyte secondary battery having a thickness of 5 mm, a width of 30 mm, a height of 25 mm, and a weight of 10 g was thus produced. The rated capacity of the battery was 250 mAh.

<Preparation of Nonaqueous Electrolyte>

Propylene carbonate (PC) and ethyl methyl carbonate (EMC) were mixed at a volume ratio of 1:1, thereby preparing a solvent mixture. A lithium hexafluorophosphate ($LiPF_6$) was dissolved in the solvent mixture at a concentration of 1 mol/L to prepare a nonaqueous electrolyte. After that, a hydrogen gas was bubbled into the nonaqueous electrolyte, thereby adjusting the hydrogen amount in the nonaqueous electrolyte.

<Production of Battery>

The electrode group obtained in the above-described way was stored in an outer can with a check valve shown in FIG. 3. Next, the nonaqueous electrolyte was poured, from a liquid pouring port provided in the surface of the sealing plate of the outer can, into the outer can storing the electrode group. Next, the liquid pouring port was sealed, thereby producing a nonaqueous electrolyte battery.

<First Charge-and-Discharge>

The nonaqueous electrolyte battery was charged up to 2.8 V at a 0.2 C rate under a 25° C. environment.

<Aging>

After the charge ratio (SOC) was set to 90%, storage was performed for 60 hrs under a 60° C. environment.

<Measurement of Gas Component>

The nonaqueous electrolyte battery was charged by constant-current charge at 20 mA under the 25° C. environment until the charge ratio reached 30%. Next, constant-voltage charge was performed until the charge current became 5 mA. The battery whose charge ratio was thus adjusted to 30% was stored for 24 hrs under a 35° C. environment. After that, an injection needle was inserted into the check valve provided in the sealing plate of the outer can to collect the gas component in the outer can and then removed from the check valve to return the interior of the outer can to the closed state again. The composition of the collected gas component was measured by gas chromatography under the above-described conditions. The result is shown in Table 3.

<Measurement of Battery Resistance>

The nonaqueous electrolyte battery was charged by constant-current charge at 20 mA under the 25° C. environment until the battery voltage reached 2.8 V. Next, constant-voltage charge was performed until the charge current became 5 mA. Subsequently, discharge was performed at 20 mA until the battery voltage reached 1.8 V. After that, constant-voltage charge was performed at 20 mA until the charge ratio became 50%, and constant-voltage charge was performed until the charge current became 5 mA. After that, the battery was left stand for 10 min, and the resistance of the battery was measured as the resistance value of the nonaqueous electrolyte battery. The result is shown in Table 4.

<Evaluation of Gas Generation Amount>

The nonaqueous electrolyte battery was charged by constant-current charge at 20 mA under the 25° C. environment until the battery voltage reached 2.8 V. Next, constant-voltage charge was performed until the charge current became 5 mA. The thus charged battery was stored for 48 hrs under a 55° C. environment.

The battery after the storage was charged and discharged, thereby adjusting the charge ratio to 50%. For the battery adjusted to the charge ratio of 50%, the thickness was measured by applying a vernier caliper to the center of the outer can under the 25° C. environment. Based on the measured thickness, the battery cell size after the storage was calculated. The difference from the calculated battery cell size after the storage was compared, thereby obtaining a cell swelling amount. More specifically, the cell thickness immediately after the production is set to 100%, and the cell thickness after the storage compared with this is represented as a cell swelling amount. The result is shown in Table 4.

Example 2

A nonaqueous electrolyte battery was produced in accordance with the same procedure as in Example 1 except that the charge ratio at the time of aging was 80%.

Example 3

A nonaqueous electrolyte battery was produced in accordance with the same procedure as in Example 1 except that the aging time was 40 hrs.

Example 4

A nonaqueous electrolyte battery was produced in accordance with the same procedure as in Example 1 except that the aging temperature was 40° C.

Example 5

A nonaqueous electrolyte battery was produced in accordance with the same procedure as in Example 1 except that the specific surface area of the positive electrode was 15 $m^2/g$, and the specific surface area of the negative electrode was 15 $m^2/g$.

Example 6

A nonaqueous electrolyte battery was produced in accordance with the same procedure as in Example 5 except that the specific surface area of the negative electrode was 10 $m^2/g$.

Example 7

A nonaqueous electrolyte battery was produced in accordance with the same procedure as in Example 5 except that the specific surface area of the positive electrode was 10 $m^2/g$.

Example 8

A nonaqueous electrolyte battery was produced in accordance with the same procedure as in Example 1 except that the solvent mixture was prepared by mixing PC, EMC, and DEC at a volume ratio of 1:1:1 as the solvent composition of the nonaqueous electrolyte.

Example 9

A nonaqueous electrolyte battery was produced in accordance with the same procedure as in Example 1 except that the nonaqueous electrolyte was prepared by dissolving lithium tetrafluoroborate ($LiBF_4$) in a solvent mixture having the same composition as in Example 1 at a concentration of 1 mol/L.

Example 10

A nonaqueous electrolyte battery was produced in accordance with the same procedure as in Example 1 except that carbonic acid was added to the nonaqueous electrolyte. The additive amount of the carbonic acid was 0.1 wt % to 1 L of solvent mixture.

Example 11

A nonaqueous electrolyte battery was produced in accordance with the same procedure as in Example 1 except that propylene glycol was added to the nonaqueous electrolyte. The additive amount of the propylene glycol was 0.1 wt % to 1 L of solvent mixture.

Example 12

A nonaqueous electrolyte battery was produced in accordance with the same procedure as in Example 1 except that the electrodes were caused to absorb a hydrogen gas by the following method. The electrode group was stored in a metal container forming the outer can while making hydrogen flow in a gas flow type globe box. After that, the pressure was set to −0.05 MPa in a vacuum chamber, and the electrode group was left stand in this state for 12 hrs, thereby causing the positive electrode and the negative electrode to absorb the hydrogen gas.

Example 13

A nonaqueous electrolyte battery was produced in accordance with the same procedure as in Example 1 except that the specific surface area of the positive electrode was 3.5 $m^2/g$, and the specific surface area of the negative electrode was 3.5 $m^2/g$.

Example 14

A nonaqueous electrolyte battery was produced in accordance with the same procedure as in Example 1 except that the specific surface area of the positive electrode was 3.5 $m^2/g$, and the specific surface area of the negative electrode was 5 $m^2/g$.

Example 15

A nonaqueous electrolyte battery was produced in accordance with the same procedure as in Example 1 except that the specific surface area of the positive electrode was 5 $m^2/g$, and the specific surface area of the negative electrode was 3.5 $m^2/g$.

Example 16

A nonaqueous electrolyte battery was produced in accordance with the same procedure as in Example 1 except that the specific surface area of the positive electrode was 2.5 $m^2/g$, and the specific surface area of the negative electrode was 2.5 $m^2/g$.

Example 17

A nonaqueous electrolyte battery was produced in accordance with the same procedure as in Example 1 except that $LiNi_{0.6}Co_{0.2}Mn_{0.3}O_2$ particles were used as the positive electrode active material.

Example 18

A nonaqueous electrolyte battery was produced in accordance with the same procedure as in Example 1 except that $LiNi_{0.5}Co_{0.2}Mn_{0.3}O_2$ particles were used as the positive electrode active material.

Example 19

A nonaqueous electrolyte battery was produced in accordance with the same procedure as in Example 1 except that $LiNi_{0.5}Co_{0.3}Mn_{0.2}O_2$ particles were used as the positive electrode active material.

Example 20

A nonaqueous electrolyte battery was produced in accordance with the same procedure as in Example 1 except that $Li_4Ti_5O_{12}$ and a monoclinic $TiO_2$ were used at a weight ratio of 50:50 as the negative electrode active material.

Example 21

A nonaqueous electrolyte battery was produced in accordance with the same procedure as in Example 1 except that the charge ratio at the time of aging was 100%, and the time was 50 hrs.

Comparative Example 1

A nonaqueous electrolyte battery was produced in accordance with the same procedure as in Example 1 except that the aging time was 10 hrs.

Comparative Example 2

A nonaqueous electrolyte battery was produced in accordance with the same procedure as in Example 1 except that the aging time was 100 hrs.

Comparative Example 3

A nonaqueous electrolyte battery was produced in accordance with the same procedure as in Example 1 except that the aging temperature was 100° C.

Comparative Example 4

A nonaqueous electrolyte battery was produced in accordance with the same procedure as in Example 1 except that the specific surface area of the positive electrode was 5 m²/g.

Comparative Example 5

A nonaqueous electrolyte battery was produced in accordance with the same procedure as in Example 1 except that the specific surface area of the positive electrode was 10 m²/g, and the specific surface area of the negative electrode was 5 m²/g.

Comparative Example 6

A positive electrode was obtained in accordance with the same procedure as in Example 1 except that $LiNiO_2$ was used as the positive electrode active material. A nonaqueous electrolyte battery was produced in accordance with the same procedure as in Example 1 except that the obtained positive electrode was used.

Comparative Example 7

A nonaqueous electrolyte battery was produced in accordance with the same procedure as in Example 1 except that items to be implemented to adjust the hydrogen gas amount were not performed.

Tables 1 and 2 below summarize the positive electrode specific surface areas, the negative electrode specific surface areas, the nonaqueous electrolyte compositions, and the aging conditions of the examples and the comparative examples.

TABLE 1

| | Positive electrode specific surface area (m²/g) | Negative electrode specific surface area (m²/g) | $\|(NE_S - PE_S)/NE_S\|$ | Nonaqueous electrolyte composition | Aging conditions | Other items to be implemented |
|---|---|---|---|---|---|---|
| Example 1 | 20 | 20 | 0 | PC and EMC (volume ratio 1:1), $LiPF_6$ at 1 mol/L | Charge ratio 90%, 60° C. 60 hrs | Hydrogen bubbling into nonaqueous electrolyte |
| Example 2 | 20 | 20 | 0 | PC and EMC (volume ratio 1:1), $LiPF_6$ at 1 mol/L | Charge ratio 80%, 60° C., 60 hrs | Hydrogen bubbling into nonaqueous electrolyte |
| Example 3 | 20 | 20 | 0 | PC and EMC (volume ratio 1:1), $LiPF_6$ at 1 mol/L | Charge ratio 90%, 60° C., 40 hrs | Hydrogen bubbling into nonaqueous electrolyte |
| Example 4 | 20 | 20 | 0 | PC and EMC (volume ratio 1:1), $LiPF_6$ at 1 mol/L | Charge ratio 90%, 40° C., 60 hrs | Hydrogen bubbling into nonaqueous electrolyte |
| Example 5 | 15 | 15 | 0 | PC and EMC (volume ratio 1:1), $LiPF_6$ at 1 mol/L | Charge ratio 90%, 60° C. 60 hrs | Hydrogen bubbling into nonaqueous electrolyte |
| Example 6 | 15 | 10 | 0.5 | PC and EMC (volume ratio 1:1), $LiPF_6$ at 1 mol/L | Charge ratio 90%, 60° C. 60 hrs | Hydrogen bubbling into nonaqueous electrolyte |
| Example 7 | 10 | 15 | 0.33 | PC and EMC (volume ratio 1:1), $LiPF_6$ at 1 mol/L | Charge ratio 90%, 60° C. 60 hrs | Hydrogen bubbling into nonaqueous electrolyte |
| Example 8 | 20 | 20 | 0.33 | PC, EMC, and DEC (volume ratio 1:1:1), $LiPF_6$ at 1 mol/L | Charge ratio 90%, 60° C. 60 hrs | Hydrogen bubbling into nonaqueous electrolyte |
| Example 9 | 20 | 20 | 0 | PC and EMC (volume ratio 1:1), $LiBF_4$ at 1 mol/L | Charge ratio 90%, 60° C. 60 hrs | Hydrogen bubbling into nonaqueous electrolyte |

TABLE 2

| | Positive electrode specific surface area (m²/g) | Negative electrode specific surface area (m²/g) | $|(NE_S - PE_S)/NE_S|$ | Nonaqueous electrolyte composition | Aging conditions | Other items to be implemented |
|---|---|---|---|---|---|---|
| Example 10 | 20 | 20 | 0 | PC and EMC (volume ratio 1:1), $LiPF_6$ at 1 mol/L | Charge ratio 90%, 60° C. 60 hrs | Addition of carbonic acid to nonaqueous electrolyte |
| Example 11 | 20 | 20 | 0 | PC and EMC (volume ratio 1:1), $LiPF_6$ at 1 mol/L | Charge ratio 90%, 60° C. 60 hrs | Addition of propylene glycol to nonaqueous electrolyte |
| Example 12 | 20 | 20 | 0 | PC and EMC (volume ratio 1:1), $LiPF_6$ at 1 mol/L | Charge ratio 90%, 60° C. 60 hrs | Hydrogen gas absorption by electrodes |
| comparative example 1 | 20 | 20 | 0 | PC and EMC (volume ratio 1:1), $LiPF_6$ at 1 mol/L | Charge ratio 90%, 60° C. 10 hrs | Hydrogen bubbling into nonaqueous electrolyte |
| comparative example 2 | 20 | 20 | 0 | PC and EMC (volume ratio 1:1), $LiPF_6$ at 1 mol/L | Charge ratio 90%, 60° C. 100 hrs | Hydrogen bubbling into nonaqueous electrolyte |
| comparative example 3 | 20 | 20 | 0 | PC and EMC (volume ratio 1:1), $LiPF_6$ at 1 mol/L | Charge ratio 90%, 100° C. 60 hrs | Hydrogen bubbling into nonaqueous electrolyte |
| comparative example 4 | 5 | 20 | 0.75 | PC and EMC (volume ratio 1:1), $LiPF_6$ at 1 mol/L | Charge ratio 90%, 60° C. 60 hrs | Hydrogen bubbling into nonaqueous electrolyte |
| comparative example 5 | 10 | 5 | 1 | PC and EMC (volume ratio 1:1), $LiPF_6$ at 1 mol/L | Charge ratio 90%, 60° C. 60 hrs | Hydrogen bubbling into nonaqueous electrolyte |
| comparative example 6 | 20 | 20 | 0 | PC and EMC (volume ratio 1:1), $LiPF_6$ at 1 mol/L | Charge ratio 90%, 60° C. 60 hrs | Hydrogen bubbling into nonaqueous electrolyte |
| comparative example 7 | 20 | 20 | 0 | PC and EMC (volume ratio 1:1), $LiPF_6$ at 1 mol/L | Charge ratio 90%, 60° C. 60 hrs | None |

Tables 1 and 2 above also show the absolute value in inequality (A) described above, that is, $|(NE_S-PE_S)/NE_S|$. As described above, this absolute value is the absolute value of a value obtained by dividing a value obtained by subtracting the positive electrode specific surface area ($PE_S$) from the negative electrode specific surface area ($NE_S$) by the negative electrode specific surface area ($NE_S$).

Tables 3 and 4 below summarize the gas compositions, the battery resistances, and the cell swelling amounts after storage obtained for the nonaqueous electrolyte batteries of Examples 1 to 12 and the nonaqueous electrolyte batteries of Comparative Examples 1 to 7.

TABLE 3

| | Gas composition | | | | |
|---|---|---|---|---|---|
| | $V_{H2}$ (cc/g) | $V_{C3H6}$ (cc/g) | $V_{CO}$ (cc/g) | $V_{C3H6}/V_{CO}$ | $V_{CO}/V_{H2}$ |
| Example 1 | 0.060 | 0.020 | 0.32 | 0.063 | 5.33 |
| Example 2 | 0.052 | 0.024 | 0.30 | 0.080 | 5.77 |
| Example 3 | 0.080 | 0.026 | 0.40 | 0.065 | 5.00 |
| Example 4 | 0.048 | 0.023 | 0.30 | 0.077 | 6.25 |
| Example 5 | 0.068 | 0.021 | 0.37 | 0.057 | 5.44 |
| Example 6 | 0.030 | 0.025 | 0.27 | 0.093 | 9.00 |
| Example 7 | 0.072 | 0.018 | 0.34 | 0.053 | 4.72 |
| Example 8 | 0.050 | 0.020 | 0.27 | 0.074 | 5.40 |
| Example 9 | 0.070 | 0.030 | 0.40 | 0.075 | 5.71 |
| Example 10 | 0.081 | 0.030 | 0.34 | 0.088 | 4.20 |
| Example 11 | 0.084 | 0.038 | 0.39 | 0.097 | 4.64 |
| Example 12 | 0.090 | 0.033 | 0.43 | 0.077 | 4.78 |
| Comparative example 1 | 0.150 | 0.010 | 0.12 | 0.083 | 0.80 |
| Comparative example 2 | 0.010 | 0.005 | 0.09 | 0.056 | 9.00 |
| Comparative example 3 | 0.018 | 0.008 | 0.16 | 0.050 | 8.89 |

TABLE 3-continued

| | Gas composition | | | | |
|---|---|---|---|---|---|
| | $V_{H2}$ (cc/g) | $V_{C3H6}$ (cc/g) | $V_{CO}$ (cc/g) | $V_{C3H6}/V_{CO}$ | $V_{CO}/V_{H2}$ |
| Comparative example 4 | 0.200 | 0.010 | 0.50 | 0.020 | 2.50 |
| Comparative example 5 | 0.015 | 0.009 | 0.19 | 0.047 | 12.67 |
| Comparative example 6 | 0.027 | 0.040 | 0.12 | 0.333 | 4.44 |
| Comparative example 7 | 0.010 | 0.024 | 0.20 | 0.120 | 20.00 |

TABLE 4

| | Characteristics | |
|---|---|---|
| | Battery resistance (mohm) | Cell swelling amount after storage (mm) |
| Example 1 | 30 | 115 |
| Example 2 | 33 | 125 |
| Example 3 | 48 | 130 |
| Example 4 | 43 | 140 |
| Example 5 | 38 | 120 |
| Example 6 | 42 | 130 |
| Example 7 | 46 | 145 |
| Example 8 | 42 | 135 |
| Example 9 | 39 | 145 |
| Example 10 | 48 | 140 |
| Example 11 | 49 | 140 |
| Example 12 | 52 | 145 |
| Comparative example 1 | 120 | 250 |

TABLE 4-continued

| | Characteristics | |
|---|---|---|
| | Battery resistance (mohm) | Cell swelling amount after storage (mm) |
| Comparative example 2 | 123 | 150 |
| Comparative example 3 | 180 | 130 |
| Comparative example 4 | 132 | 320 |
| Comparative example 5 | 143 | 200 |
| Comparative example 6 | 125 | 260 |
| Comparative example 7 | 130 | 180 |

Table 5 below summarizes the positive electrode specific surface areas, the negative electrode specific surface areas, the value of $|(NE_S-PE_S)/NE_S|$, the nonaqueous electrolyte compositions, and the aging conditions of Examples 13 to 21.

TABLE 5

| | Positive electrode specific surface area ($m^2/g$) | Negative electrode specific surface area ($m^2/g$) | $|(NE_S - PE_S)/NE_S|$ | Nonaqueous electrolyte composition | Aging conditions | Other items to be implemented |
|---|---|---|---|---|---|---|
| Example 13 | 3.5 | 3.5 | 0 | PC and EMC (volume ratio 1:1), LiPF$_6$ at 1 mol/L | Charge ratio 90%, 60° C. 60 hrs | Hydrogen bubbling into nonaqueous electrolyte |
| Example 14 | 3.5 | 5 | 0.3 | PC and EMC (volume ratio 1:1), LiPF$_6$ at 1 mol/L | Charge ratio 90%, 60° C. 60 hrs | Hydrogen bubbling into nonaqueous electrolyte |
| Example 15 | 5 | 3.5 | 0.42 | PC and EMC (volume ratio 1:1), LiPF$_6$ at 1 mol/L | Charge ratio 90%, 60° C. 60 hrs | Hydrogen bubbling into nonaqueous electrolyte |
| Example 16 | 2.5 | 2.5 | 0 | PC and EMC (volume ratio 1:1), LiPF$_6$ at 1 mol/L | Charge ratio 90%, 60° C. 60 hrs | Hydrogen bubbling into nonaqueous electrolyte |
| Example 17 | 20 | 20 | 0 | PC and EMC (volume ratio 1:1), LiPF$_6$ at 1 mol/L | Charge ratio 90%, 60° C. 60 hrs | Hydrogen bubbling into nonaqueous electrolyte |
| Example 18 | 20 | 20 | 0 | PC and EMC (volume ratio 1:1), LiPF$_6$ at 1 mol/L | Charge ratio 90%, 60° C. 60 hrs | Hydrogen bubbling into nonaqueous electrolyte |
| Example 19 | 20 | 20 | 0 | PC and EMC (volume ratio 1:1), LiPF$_6$ at 1 mol/L | Charge ratio 90%, 60° C. 60 hrs | Hydrogen bubbling into nonaqueous electrolyte |
| Example 20 | 20 | 20 | 0 | PC and EMC (volume ratio 1:1), LiPF$_6$ at 1 mol/L | Charge ratio 90%, 60° C. 60 hrs | Hydrogen bubbling into nonaqueous electrolyte |
| Example 21 | 20 | 20 | 0 | PC and EMC (volume ratio 1:1), LiPF$_6$ at 1 mol/L | Charge ratio 100%, 60° C. 50 hrs | Hydrogen bubbling into nonaqueous electrolyte |

Tables 6 and 7 below summarize the gas compositions, the battery resistances, and the cell swelling amounts after storage obtained for the nonaqueous electrolyte batteries of Examples 13 to 21.

TABLE 6

| | Gas composition | | | | |
|---|---|---|---|---|---|
| | $V_{H2}$ (cc/g) | $V_{C3H6}$ (cc/g) | $V_{CO}$ (cc/g) | $V_{C3H6}/V_{CO}$ | $V_{CO}/V_{H2}$ |
| Example 13 | 0.061 | 0.018 | 0.32 | 0.057 | 5.16 |
| Example 14 | 0.065 | 0.017 | 0.33 | 0.052 | 5.08 |
| Example 15 | 0.042 | 0.022 | 0.28 | 0.079 | 6.67 |
| Example 16 | 0.058 | 0.010 | 0.10 | 0.100 | 1.72 |
| Example 17 | 0.020 | 0.016 | 0.17 | 0.094 | 8.50 |
| Example 18 | 0.029 | 0.025 | 0.26 | 0.098 | 8.84 |
| Example 19 | 0.030 | 0.023 | 0.25 | 0.092 | 8.33 |
| Example 20 | 0.062 | 0.019 | 0.37 | 0.051 | 5.97 |
| Example 21 | 0.065 | 0.028 | 0.36 | 0.077 | 5.53 |

TABLE 7

| | Characteristics | |
|---|---|---|
| | Battery resistance (mohm) | Cell swelling amount after storage (mm) |
| Example 13 | 45 | 120 |
| Example 14 | 55 | 140 |
| Example 15 | 53 | 125 |
| Example 16 | 61 | 120 |
| Example 17 | 40 | 142 |
| Example 18 | 35 | 137 |
| Example 19 | 32 | 120 |
| Example 20 | 45 | 147 |
| Example 21 | 32 | 110 |

As shown in Table 3, for all the nonaqueous electrolyte batteries of Examples 1 to 12, the hydrogen gas amount $V_{H2}$ was from 0.02 (cc/g) (inclusive) to 0.1 (cc/g) (inclusive). Additionally, for all the nonaqueous electrolyte batteries, $V_{C3H6}/V_{CO}$ was from 0.05 (inclusive) to 0.1 (inclusive), and $V_{CO}/V_{H2}$ was from 1 (inclusive) to 9 (inclusive). As shown in Table 4, for all the nonaqueous electrolyte batteries of Examples 1 to 12, the value of the battery resistance was as small as 100 mOhm or less, and the cell swelling amount was also suppressed.

On the other hand, in the nonaqueous electrolyte battery of Comparative Example 1, $V_{CO}/V_{H2}$ was less than 1. In Comparative Examples 2, 3, 5, and 7, $V_{CO}/V_{H2}$ was more than 9. In Comparative Examples 4, 5, 6, and 7, $V_{C3H6}/V_{CO}$ did not satisfy the range of 0.05 (inclusive) to 0.1 (inclusive). The resistance value was high as compared to Examples 1 to 12, and in most cases, the cell swelling amount after storage was larger than in the examples. In the nonaqueous electrolyte batteries represented by the comparative examples, the battery resistance was high, and the cell swelling was large.

More specifically, in the nonaqueous electrolyte battery of Comparative Example 1, the hydrogen gas amount $V_{H2}$ was more than 0.1 (cc/g), and $V_{CO}/V_{H2}$ was less than 1. It is considered that since the aging time was short, carried-in water could not be completely removed at the time of aging, and the cell swelling became large. In addition, the diffusion of lithium ions was impeded by the generated gas, and the resistance increased.

In the nonaqueous electrolyte battery of Comparative Example 2, the hydrogen gas amount $V_{H2}$ was less than 0.02 (cc/g), and $V_{CO}/V_{H2}$ was more than 9. Since the aging time was too long, most of the hydrogen gas generated in the negative electrode was oxidized in the positive electrode, and the hydrogen gas amount largely decreased. It is considered that although the decomposition of carried-in water in the storage test was suppressed, the formation of LiF could not be suppressed, and the increase in the resistance became large.

In the nonaqueous electrolyte battery of Comparative Example 7 as well, the hydrogen gas amount $V_{H2}$ was less than 0.02 (cc/g), and $V_{CO}/V_{H2}$ was more than 9. It is considered that since the processing for adjusting the hydrogen gas was not executed, and the hydrogen amount was small, the generation of LiF could not be suppressed, the increase in the resistance was large, and the gas generation amount became large.

In the nonaqueous electrolyte battery of Comparative Example 3, the hydrogen gas amount $V_{H2}$ was less than 0.02 (cc/g), and $V_{CO}/V_{H2}$ was more than 8. Although the removal of carried-in water progressed, electrode degradation progressed because of the high aging temperature. Although gas generation was suppressed, the resistance component in the electrodes increased. It is considered that, additionally, since the hydrogen gas amount is small, the LiF generation was not suppressed, and the increase in the resistance became large.

In the nonaqueous electrolyte battery of Comparative Example 4, it can be seen that the hydrogen gas amount $V_{H2}$ was more than 0.1 (cc/g), $V_{C3H6}/V_{CO}$ was less than 0.05, and the decomposition of the carried-in impurity on the negative electrode was large. It is considered that since the specific surface area of the negative electrode was larger than that of the positive electrode, and therefore, the oxidation capability of the positive electrode is insufficient relative to the side reaction amount on the negative electrode, the gas generation amount became large.

In the nonaqueous electrolyte battery of Comparative Example 5, the hydrogen gas amount $V_{H2}$ was less than 0.02 (cc/g), $V_{C3H6}/V_{CO}$ was less than 0.05, and $V_{CO}/V_{H2}$ was more than 9. It is considered that since the specific surface area of the positive electrode was larger than that of the negative electrode, and therefore, the reducing gas was oxidized in the positive electrode, the hydrogen gas amount was small, the formation of LiF could not be suppressed, and the increase in the resistance became large.

In the nonaqueous electrolyte battery of Comparative Example 6, $V_{C3H6}/V_{CO}$ was more than 0.1. It is considered that since $LiNiO_2$ was used as the positive electrode active material, the oxidation capability of the positive electrode was low as compared to a case in which $Li_{1-x}Ni_{1-a-b}Co_aMn_bO_2$ (that satisfies $-0.2 \leq x \leq 0.5$, $0 < a \leq 0.5$, and $0 < b \leq 0.5$) was used, and the gas generated in the negative electrode could not be oxidized in the positive electrode, the generation amount of the $C_3H_6$ gas became large.

As shown by Examples 13 to 16 described in Tables 5 and 6, even when the positive electrode specific surface area and the negative electrode specific surface area were changed from the values in Example 1, the hydrogen gas amount $V_{H2}$ was from 0.02 (cc/g) (inclusive) to 0.1 (cc/g) (inclusive) in each of the nonaqueous electrolyte batteries. Additionally, in all the nonaqueous electrolyte batteries, $V_{C3H6}/V_{CO}$ was from 0.05 (inclusive) to 0.1 (inclusive), and $V_{CO}/V_{H2}$ was from 1 (inclusive) to 9 (inclusive).

As shown in Table 7, in all the nonaqueous electrolyte batteries of Examples 13 to 21, the value of the battery resistance was as small as 100 mOhm or less, and the cell swelling amount was also suppressed.

A nonaqueous electrolyte battery according to at least one of the above-described embodiments and examples includes a positive electrode containing, as apositive electrode active material, a lithium containing nickel cobalt manganese composite oxide represented by $Li_{1-x}Ni_{1-a-b}Co_aMn_bO_2$ (that satisfies $-0.2 \le x \le 0.5$, $0 < a \le 0.5$, and $0 < b \le 0.5$), and a negative electrode containing a lithium titanium composite oxide having a spinel structure as a negative electrode active material, and the gas composition in the container member when the charge ratio of the nonaqueous electrolyte battery is adjusted to 30%, and the nonaqueous electrolyte battery is left stand at 35° C. for 24 hrs satisfies inequalities (1) to (3). Hence, since the decomposition of the nonaqueous electrolyte such as LiF formation on the negative electrode, electrolysis of water, and coat formation are suppressed, and an increase in the battery resistance and battery swelling can be suppressed, it is possible to implement a nonaqueous electrolyte battery with excellent output performance.

What is claimed is:

1. A nonaqueous electrolyte battery comprising:
   a container member;
   a positive electrode stored in the container member and containing, as a positive electrode active material, a lithium containing nickel cobalt manganese composite oxide represented by $Li_{1-x}Ni_{1-a-b}Co_aMn_bO_2$ (that satisfies $-0.2 \le x \le 0.5$, $0 < a \le 0.5$, and $0 < b \le 0.5$);
   a negative electrode stored in the container member, and comprising a negative electrode current collector and a negative electrode mixture layer formed on the negative electrode current collector,
   wherein the negative electrode mixture layer contains a lithium titanium composite oxide having a spinel structure as a negative electrode active material; and
   a nonaqueous electrolyte stored in the container member, and comprising a propylene carbonate as a solvent,
   wherein a specific surface area of the negative electrode measured by the BET method with $N_2$ absorption falls within a range of 2.5 m²/g (inclusive) to 20 m²/g (inclusive), and a weight of the negative electrode is a weight of the negative electrode mixture layer,
   a specific surface area ($PE_S$) of the positive electrode and the specific surface area ($NE_S$) of the negative electrode satisfy a relation given by $$0 \le |(NE_S - PE_S)/NE_S| \le 0.5 \quad (A),$$ and wherein a gas composition in the container member when a charge ratio of the nonaqueous electrolyte battery is set to 30%, and the nonaqueous electrolyte battery is left stand at 35° C. for 24 hrs satisfies $$0.02 \text{ (cc/g)} \le V_{H2} \le 0.1 \text{ (cc/g)} \quad (1)$$

$$0.05 \le V_{C3H6}/V_{CO} \le 0.1 \quad (2)$$

$$1 \le V_{CO}/V_{H2} \le 9 \quad (3)$$

where $V_{H2}$ is a hydrogen gas amount (cc) per 1 g of the negative electrode mixture layer, $V_{C3H6}$ is a propylene gas amount (cc) per 1 g of the negative electrode mixture layer, and $V_{CO}$ is a carbon monoxide gas amount (cc) per 1 g of the negative electrode mixture layer.

2. The nonaqueous electrolyte battery according to claim 1, wherein the solvent further comprises one type of chain carbonates or two or more types of chain carbonates.

3. The nonaqueous electrolyte battery according to claim 1, wherein the specific surface area of the positive electrode measured by the BET method with $N_2$ absorption falls within a range of 2.5 m²/g (inclusive) to 25 m²/g (inclusive), and a weight of the positive electrode is a weight of a positive electrode mixture layer.

4. A battery pack including one or two or more the nonaqueous electrolyte battery according to claim 1.

* * * * *

UNITED STATES PATENT AND TRADEMARK OFFICE
CERTIFICATE OF CORRECTION

Page 1 of 1

PATENT NO. : 11,038,206 B2
APPLICATION NO. : 16/398383
DATED : June 15, 2021
INVENTOR(S) : Asuna Hagiwara et al.

It is certified that error appears in the above-identified patent and that said Letters Patent is hereby corrected as shown below:

On the Title Page

Item (73), should read:
-- (73) Assignees: KABUSHIKI KAISHA TOSHIBA, Minato-ku (JP); Toshiba Infrastructure Systems & Solutions Corporation, Kawasaki (JP) --

Signed and Sealed this
Sixteenth Day of November, 2021

Drew Hirshfeld
*Performing the Functions and Duties of the
Under Secretary of Commerce for Intellectual Property and
Director of the United States Patent and Trademark Office*